United States Patent
Yamaura

(10) Patent No.: US 10,278,058 B2
(45) Date of Patent: *Apr. 30, 2019

(54) WIRELESS COMMUNICATION DEVICE INFORMATION PROCESSING DEVICE, AND COMMUNICATION METHOD

(71) Applicant: SONY CORPORATION, Tokyo (JP)

(72) Inventor: Tomoya Yamaura, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/030,390

(22) Filed: Jul. 9, 2018

(65) Prior Publication Data

US 2018/0332536 A1 Nov. 15, 2018

Related U.S. Application Data

(63) Continuation of application No. 15/362,148, filed on Nov. 28, 2016, which is a continuation of application
(Continued)

(30) Foreign Application Priority Data

Apr. 13, 2012 (JP) ................................ 2012-091549

(51) Int. Cl.
*H04W 8/00* (2009.01)
*H04W 76/14* (2018.01)
(Continued)

(52) U.S. Cl.
CPC ......... *H04W 8/005* (2013.01); *H04L 63/0428* (2013.01); *H04L 67/104* (2013.01);
(Continued)

(58) Field of Classification Search
CPC . H04W 8/005; H04W 52/0229; H04W 76/14; H04W 84/12; H04W 76/22;
(Continued)

(56) References Cited

U.S. PATENT DOCUMENTS 7,664,129 B2 2/2010 Takagi et al.
8,473,573 B2 6/2013 Park
(Continued)

FOREIGN PATENT DOCUMENTS

BR P10711371 A2 11/2011
BR 112012011660 A2 7/2016
(Continued)

OTHER PUBLICATIONS

Wi-Fi Peer-to-Peer (P2P) Technical Specification, Version 1.2, Wi-Fi Alliance Technical Committee P2P Task Group, 159 pages.
(Continued)

*Primary Examiner* — Tejis Daya
(74) *Attorney, Agent, or Firm* — Chip Law Group

(57) ABSTRACT

Provided is a wireless communication device to perform an inter-device wireless communication with another wireless communication device in accordance with the Wi-Fi (Wireless Fidelity) Direct specification. This wireless communication device includes a transmitting unit. This transmitting unit incorporates information about the role of the wireless communication device into an action frame specified in the IEEE (Institute of Electrical and Electronic Engineers) 802.11 specification, and then transmits the action frame.

18 Claims, 21 Drawing Sheets

Related U.S. Application Data

No. 14/385,549, filed as application No. PCT/JP2013/056323 on Mar. 7, 2013, now Pat. No. 9,538,567.

(51) Int. Cl.

| | | |
|---|---|---|
| *H04L 29/06* | (2006.01) | |
| *H04L 29/08* | (2006.01) | |
| *H04M 1/725* | (2006.01) | |
| *H04W 52/02* | (2009.01) | |
| *H04W 4/80* | (2018.01) | |
| *H04W 76/22* | (2018.01) | |
| *H04W 84/12* | (2009.01) | |

(52) U.S. Cl.
CPC ............ *H04L 67/125* (2013.01); *H04L 67/16* (2013.01); *H04L 69/321* (2013.01); *H04M 1/7253* (2013.01); *H04W 52/0229* (2013.01); *H04W 76/14* (2018.02); *H04M 2250/06* (2013.01); *H04W 4/80* (2018.02); *H04W 76/22* (2018.02); *H04W 84/12* (2013.01); *Y02D 70/00* (2018.01); *Y02D 70/142* (2018.01); *Y02D 70/22* (2018.01)

(58) Field of Classification Search
CPC .... H04W 4/80; H04L 67/104; H04L 63/0428; H04L 69/321; H04L 67/125; H04L 67/16; Y02D 70/00; Y02D 70/142; Y02D 70/22; H04M 2250/06; H04M 1/7253
See application file for complete search history.

(56) References Cited

U.S. PATENT DOCUMENTS

| | | | |
|---|---|---|---|
| 8,667,144 B2 * | 3/2014 | Dharmaraju | H04W 8/005 |
| | | | 709/203 |
| 8,674,957 B2 * | 3/2014 | Raveendran | G06F 3/0481 |
| | | | 345/173 |
| 9,369,947 B2 | 6/2016 | Lee et al. | |
| 9,504,069 B2 | 11/2016 | Jeong et al. | |
| 9,538,567 B2 | 1/2017 | Yamaura | |
| 9,544,931 B2 | 1/2017 | Yamaura | |
| 9,961,627 B2 * | 5/2018 | Kim | H04W 8/005 |
| 2007/0141984 A1 | 6/2007 | Kuehnel et al. | |
| 2007/0141988 A1 | 6/2007 | Kuehnel et al. | |
| 2009/0239469 A1 | 9/2009 | Rangarajan et al. | |
| 2010/0254286 A1 | 10/2010 | Rangarajan et al. | |
| 2010/0322213 A1 | 12/2010 | Liu et al. | |
| 2011/0090886 A1 | 4/2011 | Park et al. | |
| 2011/0107388 A1 * | 5/2011 | Lee | H04L 65/1066 |
| | | | 725/118 |
| 2011/0128946 A1 | 6/2011 | Saito et al. | |
| 2011/0149806 A1 * | 6/2011 | Verma | H04L 12/2809 |
| | | | 370/255 |
| 2011/0149816 A1 | 6/2011 | Saito et al. | |
| 2011/0191825 A1 | 8/2011 | Kageyama et al. | |
| 2011/0275316 A1 | 11/2011 | Suumaki et al. | |
| 2012/0158839 A1 | 6/2012 | Hassan et al. | |
| 2012/0230443 A1 * | 9/2012 | Seok | H04B 7/0632 |
| | | | 375/260 |
| 2012/0243524 A1 * | 9/2012 | Verma | H04W 48/16 |
| | | | 370/338 |
| 2012/0297306 A1 | 11/2012 | Hassan et al. | |
| 2012/0322368 A1 | 12/2012 | Desai et al. | |
| 2013/0157568 A1 | 6/2013 | Jain et al. | |
| 2013/0229944 A1 | 9/2013 | Montemurro et al. | |
| 2014/0120829 A1 * | 5/2014 | Bhamidipati | H04N 21/42207 |
| | | | 455/3.06 |
| 2014/0351477 A1 * | 11/2014 | Lee | G06F 1/1632 |
| | | | 710/303 |
| 2015/0071147 A1 | 3/2015 | Yamaura | |
| 2015/0085847 A1 | 3/2015 | Yamaura | |
| 2015/0326654 A1 | 11/2015 | Lee et al. | |
| 2015/0341849 A1 * | 11/2015 | Lee | H04W 48/16 |
| | | | 455/41.2 |
| 2017/0013027 A1 | 1/2017 | Lee et al. | |

FOREIGN PATENT DOCUMENTS

| | | |
|---|---|---|
| CA | 2651236 A1 | 11/2007 |
| CA | 2780669 A1 | 5/2011 |
| CN | 101605299 A | 12/2009 |
| CN | 102082828 A | 6/2011 |
| CN | 102149046 A | 8/2011 |
| CN | 102577581 A | 7/2012 |
| CN | 102668647 A | 9/2012 |
| EP | 2018720 A2 | 1/2009 |
| EP | 2292024 A2 | 3/2011 |
| EP | 2487963 A2 | 8/2012 |
| JP | 2008-219358 A | 9/2008 |
| JP | 2009-521191 A | 5/2009 |
| JP | 2009-538048 A | 10/2009 |
| JP | 2011-124980 A | 6/2011 |
| JP | 2011-517884 A | 6/2011 |
| JP | 5000711 B2 | 8/2012 |
| JP | 5060627 B2 | 10/2012 |
| JP | 2013-507876 A | 3/2013 |
| JP | 5718933 B2 | 5/2015 |
| JP | 5965014 B2 | 8/2016 |
| JP | 2016-187217 A | 10/2016 |
| KR | 10-2008-0085743 A | 9/2008 |
| KR | 10-2009-0026132 A | 3/2009 |
| KR | 10-2010-0126433 A | 12/2010 |
| KR | 10-2011-0048457 A | 5/2011 |
| KR | 10-2011-0125756 A | 11/2011 |
| KR | 10-2012-0013508 A | 2/2012 |
| KR | 10-2012-0103567 A | 9/2012 |
| RU | 2305900 C2 | 9/2007 |
| RU | 2008145037 A | 5/2010 |
| TW | 200801969 A | 1/2008 |
| TW | 200947966 A | 11/2009 |
| WO | 2007/136622 A2 | 11/2007 |
| WO | 2009/120576 A2 | 10/2009 |
| WO | 2011/046393 A2 | 4/2011 |
| WO | 2011/059248 A2 | 5/2011 |
| WO | 2011/062404 A2 | 5/2011 |
| WO | 2012/040251 A2 | 3/2012 |

OTHER PUBLICATIONS http://www.lg.com/kz/support/smartshare/dlna.
https://software.intel.com/ru-ru/articles/how-to-enable-intel-wireless-display-differentiation-for-miracast-on-intel-architecture.
Office Action for EP Patent Application No. 137762415, dated May 23, 2018, 5 pages.
Examination Report for SG Patent Application No. 11201406384Q, dated Dec. 29, 2016, 06 pages.
"Miracast Wireless Display for Standard Phones with Intel Architecture", Harnessing the power of Intel technology, Nov. 19, 2013, 08 pages.
"Smartshare DLNA(Digital Living Network Alliance)", LG, http://www.lg.com/kz/support/smartshare/dlna, Mar. 3, 2016, 03 pages.
Office Action for CN Patent Application No. 201380017965.5, dated Feb. 9, 2018, 06 pages of Office Action and 08 pages of English Translation.
Office Action for CN Patent Application No. 201380017765.X, dated Nov. 6, 2017, 08 pages of Office Action and 21 pages of English Translation.
Office Action for CN Patent Application No. 201380017755.6, dated Nov. 6, 2017, 08 pages of Office Action and 21 pages of English Translation.
Office Action for JP Patent Application No. 2016-207224, dated Dec. 19, 2017, 03 pages of Office Action and 02 pages of English Translation.
Examination Report and Written Opinion received for SG Patent Application No. 11201406384Q, dated May 18, 2016, 04 pages.
Extended European Search Report for EP Patent Application No. 13776298.5, dated Jul. 7, 2016, 08 pages.

(56) References Cited

OTHER PUBLICATIONS

Partial European Search Report for EP Patent Application No. 13775819.9, dated Oct. 27, 2015.
Partial European Search Report for EP Patent Application No. 13776241.5, dated Oct. 30, 2015.
Wireless LAN Medium Access Control (MAC) and Physical Layer (PHY) Specifications, IEEE Computer Society, SBN 978-0-7381-7245-3 STDPD97218, New York, USA, Mar. 29, 2012, pp. 2793.
Office Action for SG Patent Application No. 11201406386T, dated May 28, 2015.
International Search Report and Written Opinion for PCT Application No. PCT/JP2013/056323, dated Jun. 4, 2013, 06 pages of translation and 06 pages of ISRWO.
Notice of Allowance for U.S. Appl. No. 15/362,148, dated Jun. 28, 2018, 07 pages.
Notice of Allowance for U.S. Appl. No. 15/362,148, dated Jun. 13, 2018, 02 pages.
Notice of Allowance for U.S. Appl. No. 15/362,148, dated Apr. 25, 2018, 02 pages.
Notice of Allowance for U.S. Appl. No. 15/362,148, dated Mar. 27, 2018, 05 pages.
Non-Final Office Action for U.S. Appl. No. 15/362,148, dated Sep. 14, 2017, 13 pages.
Notice of Allowance for U.S. Appl. No. 14/385,549, dated Aug. 26, 2016, 09 pages.
Final Office Action for U.S. Appl. No. 14/385,549, dated Jun. 3, 2016, 10 pages.
Non-Final Office Action for U.S. Appl. No. 14/385,549, dated Jan. 15, 2016, 19 pages.
International Preliminary Report on Patentability of PCT Application No. PCT/JP2013/056323, issued on Dec. 27, 2016, 07 pages of English Translation and 05 pages of IPRP.
Extended European Search Report of EP Patent Application No. 18189458.5, dated Oct. 11, 2018, 07 pages.
Extended European Search Report of EP Patent Application No. 18189483.3, dated Oct. 15, 2018, 07 pages.
Office Action for KR Patent Application No. 10-2014-7027527, dated Feb. 9, 2019, 06 pages of Office Action and 05 pages of English Translation.
Office Action for KR Patent Application No. 10-2014-7027597, dated Feb. 18, 2019, 05 pages of Office Action and 05 pages of English Translation.
Office Action for KR Patent Application No. 10-2018-7035829, dated Feb. 11, 2019, 05 pages of Office Action and 04 pages of English Translation.
"Qualcomm Atheros Introduces First Generation of Wi-Fi Display-Enabled Connectivity Solutions", Jan. 10, 2012., 1 page.

* cited by examiner

FIG. 3

PEER LIST 180

| | TERMINAL IDENTIFICATION INFORMATION (181) | MAC ADDRESS (182) | TERMINAL TYPE (183) | SPECIFIC APPLICATION ASSOCIATION (184) |
|---|---|---|---|---|
| 1 | BBBB (SECOND WIRELESS COMMUNICATION DEVICE) | ... | TV | ASSOCIATED (VIDEO Rx) |
| 2 | CCCC (THIRD WIRELESS COMMUNICATION DEVICE) | ... | PC | N/A |
| 3 | DDDD (FOURTH WIRELESS COMMUNICATION DEVICE) | ... | SMARTPHONE | ASSOCIATED (AUDIO Tx) |
| 4 | – | – | – | – |
| ⋮ | ⋮ | ⋮ | ⋮ | ⋮ |

FIG. 13

| APPLICATION TYPE | Application to be triggered | Device Role in this application | L4 setup information | Application Capabilitites |
|---|---|---|---|---|
| Wi-Fi CERTIFIED Miracast | – | INFORMATION INDICATING source OR sink | RTSP port NUMBER | Content protection COMPATIBILITY INFORMATION |
| APPLICATION USING P2P (SUCH AS DLNA) | APPLICATION NAME (SUCH AS DLNA) | INFORMATION INDICATING DMC OR DMR | CONTROL PROTOCOL Port NUMBER | · video-codec, resolution · audio-codec, resolution |

EXAMPLE WFD SESSION IN CASE WHERE ONLY AUDIO COMMUNICATIONS ARE PERFORMED

EXAMPLE WFD SESSION IN CASE WHERE ONLY VIDEO COMMUNICATIONS ARE PERFORMED

EXAMPLE WFD SESSION IN CASE WHERE AUDIO AND VIDEO COMMUNICATIONS ARE PERFORMED

EXAMPLE WFD SESSION IN CASE WHERE COMMUNICATIONS WITH COUPLED Sinks ARE PERFORMED

US 10,278,058 B2

WIRELESS COMMUNICATION DEVICE INFORMATION PROCESSING DEVICE, AND COMMUNICATION METHOD

CROSS REFERENCE TO RELATED APPLICATIONS

The present application is a continuation application of U.S. patent application Ser. No. 15/362,148, filed Nov. 28, 2016, which is a continuation application of U.S. patent application Ser. No. 14/385,549, filed Sep. 16, 2014, now U.S. Pat. No. 9,538,567, which is a National Stage of PCT/JP2013/056323, filed Mar. 7, 2013, and claims the benefit of priority from prior Japanese Patent Application JP 2012-091549, filed Apr. 13, 2012, the entire content of which is hereby incorporated by reference.

TECHNICAL FIELD

The present technique relates to wireless communication devices. More particularly, the present technique relates to wireless communication devices that exchange various kinds of information by using wireless communications, an information processing device, and a communication method.

BACKGROUND ART

In recent years, wireless communication devices that perform wireless communications by using wireless LANs (local Area Networks) have been widely spread. As typical examples of the wireless LANs, wireless LANs compliant with IEEE (Institute of Electrical and Electronics Engineers) 802.11 are widely spread.

There is also a suggested wireless communication system that performs wireless communications by using the same frequency among wireless communication devices (see Patent Document 1, for example).

CITATION LIST

Patent Document

Patent Document 1: Japanese Patent Application Laid-Open No. 2011-124980

SUMMARY OF THE INVENTION

Problems to be Solved by the Invention

With the above conventional technique, a connection to another group can be established while the connections among the wireless communication devices forming the same group are maintained.

While the wireless communication devices are wirelessly connected, various kinds of applications might be executed among those wireless communication devices. For example, an application might be designated by a user operation both before and after wireless connection establishment. In this case, it would be convenient if an application desired by a user can be readily used both before and after wireless connection establishment, for example.

The present technique has been developed in view of those circumstances, and aims to allow users to readily use desired applications.

Solutions to Problems

The present technique has been developed to solve the above problem, and a first aspect thereof is a wireless communication device, a communication method for the wireless communication device, and a program for causing a computer to implement the method. The wireless communication device performs an inter-device wireless communication with another wireless communication device in accordance with the Wi-Fi (Wireless Fidelity) Direct specification, and includes a transmitting unit that incorporates information about the role of the wireless communication device into an action frame specified in the IEEE (Institute of Electrical and Electronic Engineers) 802.11 specification, and transmits the action frame. With this structure, an inter-device wireless communication can be performed with another wireless communication device in accordance with the Wi-Fi Direct specification, and information about the role of the wireless communication device can be incorporated into an action frame specified in the IEEE802.11 specification, and then be transmitted.

In this first aspect, the transmitting unit may perform the transmission when the wireless communication device is P2P (Peer-to-Peer)-connected to the other wireless communication device. With this arrangement, the transmission can be performed when a P2P connection to another wireless communication device is maintained.

In this first aspect, the information about the role of the wireless communication device may be information about one of a source and a sink that are compliant with the Wi-Fi Display specification. With this arrangement, information about a source or a sink compliant with the Wi-Fi Display specification can be incorporated into an action frame specified in the IEEE802.11 specification, and then be transmitted.

In this first aspect, the action frame may be a vendor specific action frame specified in the IEEE802.11 specification. With this arrangement, information about the role of the wireless communication device can be incorporated into a vendor specific action frame specified in the IEEE802.11 specification, and then be transmitted.

In this first aspect, the information about the role of the wireless communication device may be incorporated into a vendor specific content area in the vendor specific action frame. With this arrangement, information about the role of the wireless communication device can be incorporated into the vendor specific content area in a vendor specific action frame, and then be transmitted.

In this first aspect, the action frame may include a type information portion and an information element portion. With this arrangement, an action frame that includes a type information portion and an information element portion can be transmitted.

In this first aspect, the transmitting unit may incorporate information about the fourth layer into the action frame, and then transmit the action frame. With this arrangement, information about the fourth layer can be incorporated into an action frame, and then be transmitted.

In this first aspect, the information about the fourth layer may include at least information about RTSP. With this arrangement, fourth layer information that includes at least information about RTSP can be transmitted.

In this first aspect, the information about the fourth layer may include at least information about the port number used in the RTSP. With this arrangement, fourth layer information that includes at least information about the port number used in RTSP can be transmitted.

In this first aspect, the information about the role of the wireless communication device and the information about the fourth layer may be arranged so that the information about the role of the wireless communication device comes before the information about the fourth layer in the action frame. With this arrangement, an action frame in which information about the role of the wireless communication device and information about the fourth layer are arranged in this order can be transmitted.

In this first aspect, the transmitting unit may incorporate capability information into the action frame, and then transmit the action frame. With this arrangement, capability information can be incorporated into an action frame, and then be transmitted.

In this first aspect, the capability information may include at least information about the existence or non-existence of compatibility with content protection compliant with the Wi-Fi Display specification. With this arrangement, capability information that includes at least information about the existence or non-existence of compatibility with content protection compliant with the Wi-Fi Display specification can be transmitted.

A second aspect of the present technique is a wireless communication device, a communication method for the wireless communication device, and a program for causing a computer to implement the method. The wireless communication device includes: a communication unit that performs an inter-device wireless communication with another device discovered through a connection discovery process; and a control unit that operates a first application designated in the connection discovery process based on the timing of establishment of a connection of the inter-device wireless communication, wherein, when a second application is executed while the first application is being operated, the communication unit incorporates information about the second application into an action frame specified in the IEEE802.11 specification, and transmits the action frame. With this structure, an inter-device wireless communication can be performed with another device discovered through a connection discovery process, a first application designated in the connection discovery process can be operated based on the timing of establishment of a connection of the inter-device wireless communication, and information about a second application can be incorporated into an action frame specified in the IEEE802.11 specification and then be transmitted when the second application is executed while the first application is being operated.

In this second aspect, the control unit may end the first application based on the timing of a start of operation of the second application. With this arrangement, the first application can be ended based on the timing of a start of operation of the second application.

In this second aspect, the control unit may reduce the amount of data being communicated about the first application based on the timing of a start of operation of the second application. With this arrangement, the amount of data being communicated about the first application can be reduced based on the timing of a start of operation of the second application.

In this second aspect, the control unit may regularly or irregularly check the operation state of the first application after a start of operation of the second application. With this arrangement, the operation state of the first application can be regularly or irregularly checked after a start of operation of the second application.

In this second aspect, the second application may be Wi-Fi CERTIFIED Miracast. With this arrangement, information about Wi-Fi CERTIFIED Miracast can be incorporated into an action frame specified in the IEEE802.11 specification, and then be transmitted.

In this second aspect, the first application may be DLNA (Digital Living Network Alliance). With this arrangement, DLNA designated in a connection discovery process can be operated.

In this second aspect, the communication unit may transmit a FIN packet (finish packet) in TCP (Transmission Control Protocol) based on the timing of the start of operation of the second application. With this arrangement, a FIN packet in TCP can be transmitted based on the timing of a start of operation of the second application.

A third aspect of the present technique is a wireless communication device, a communication method for the wireless communication device, and a program for causing a computer to implement the method. The wireless communication device performs an inter-device wireless communication with another wireless communication device in accordance with the Wi-Fi (Wireless Fidelity) Direct specification, and includes: a transmitting unit that incorporates information about the role of the wireless communication device into an action frame specified in the IEEE (Institute of Electrical and Electronic Engineers) 802.11 specification, and transmits the action frame; a display unit that displays image data; and a protocol switching unit that switches the protocol using the inter-device wireless communication. With this structure, an inter-device wireless communication can be performed with another wireless communication device in accordance with the Wi-Fi Direct specification, information about the role of the wireless communication device can be incorporated into an action frame specified in the IEEE802.11 specification and then be transmitted, image data can be displayed, and the protocol using the inter-device wireless communication can be switched.

In this third aspect, the wireless communication device may further include an operation accepting unit that accepts a user operation, and the transmitting unit transmits the information about the role of the wireless communication device based on the timing of acceptance of a user operation for starting a communication of image data, the user operation having been accepted by the operation accepting unit. With this arrangement, information about the role of the wireless communication device can be transmitted based on the timing of acceptance of a user operation (a user operation for starting a communication of image data) accepted by the operation accepting unit.

In this third aspect, the transmitting unit may transmit image data displayed on the display unit, by using the protocol switched by the protocol switching unit. With this arrangement, image data displayed on the display unit can be transmitted by using the protocol switched by the protocol switching unit.

A fourth aspect of the present technique is an information processing device, an information processing method for the information processing device, and a program for causing a computer to implement the program. The information processing device includes: a processor; and a memory storing a program to be executed by the processor. The program causes the processor to carry out: a first procedure to perform an inter-device wireless communication with another device in accordance with the Wi-Fi Direct specification; and a second procedure to incorporate information about the role of the wireless communication device using the information processing device into an action frame specified in the IEEE802.11 specification, and transmit the action frame. With this structure, an inter-device wireless communication can be performed with another device in accordance with the Wi-Fi Direct specification, and information about the role of the wireless communication device using the information processing device can be incorporated into an action frame specified in the IEEE802.11 specification, and then be transmitted.

In this fourth aspect, the program may further cause the processor to carry out a signal processing procedure to process image data. With this arrangement, signal processing can be performed to process image data.

In this fourth aspect, the program may further cause the processor to carry out a procedure to adjust power consumption in accordance with operation of the processor. With this arrangement, power consumption can be adjusted in accordance with operation of the processor.

Effects of the Invention

The present technique can provide a great effect to allow users to readily use desired applications.

BRIEF DESCRIPTION OF DRAWINGS

FIG. 3 is a diagram schematically showing an example structure of a peer list 180 stored in the memory 150 in the first embodiment of the present technique.

FIG. 13 is a diagram showing an example of the information element to be transmitted/received in a communication process between respective communication devices in the first embodiment of the present technique.

MODES FOR CARRYING OUT THE INVENTION

The following is a description of modes for carrying out the present technique (hereinafter referred to as the embodiments). Explanation will be made in the following order.
1. First embodiment (Communication control: an example where a specific application to be used after establishment of a connection in the second layer is designated, without cutoff of the connection in the second layer)
2. Second embodiment (Communication control: an example of an information processing device used in a wireless communication device)

1. Embodiments

Example Structure of a Communication System

Figure 1:
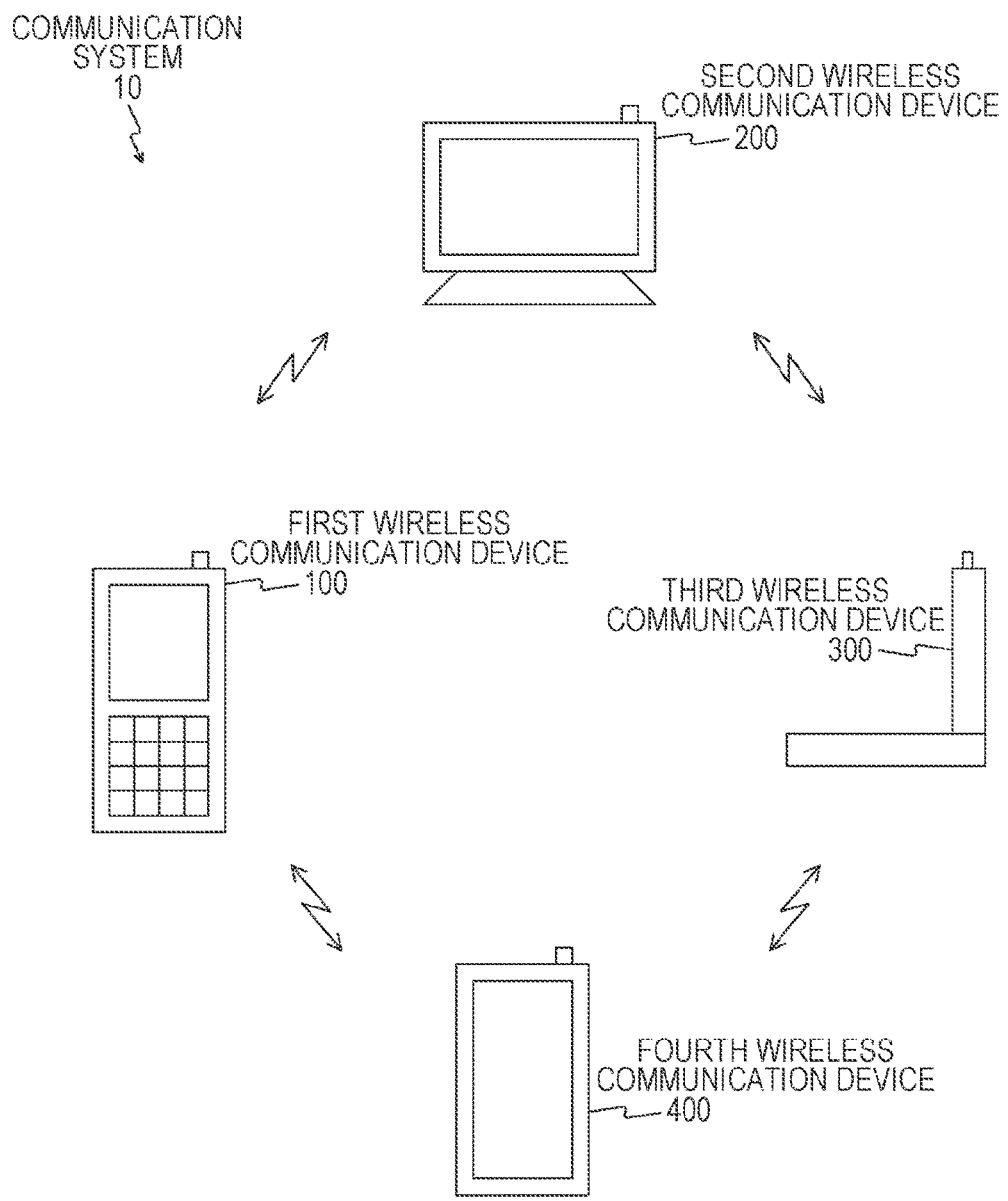
FIG. 1 is a diagram showing an example structure of a communication system 10 in a first embodiment of the present technique.

FIG. 1 is a diagram showing an example structure of a communication system 10 in a first embodiment of the present technique.

The communication system 10 includes a first wireless communication device 100, a second wireless communication device 200, a third wireless communication device 300, and a fourth wireless communication device 400.

The first wireless communication device 100, the second wireless communication device 200, the third wireless communication device 300, and the fourth wireless communication device 400 each have a wireless communication function, are connected to one another, and are capable of transmitting/receiving various kinds of information by using wireless communications. The respective wireless communication devices are wireless communication device compliant with IEEE (Institute of Electrical and Electronics Engineers) 802.11, which enables P2P (Peer to Peer) connections. That is, the respective wireless communication devices form a communication group, and can communicate directly with one another without the intervention of an access point (not shown). In this case, which wireless communication device is to operate as the group owner and which wireless communication devices are to operate as clients may or may not be determined when the respective wireless communication devices are manufactured. In a case where any determination is not made at the time of manufacturing, the wireless communication devices can determine, through negotiation, which one of the wireless communication devices is to operate as the group owner, and which ones of the wireless communication devices are to operate as clients. For example, in a case where the first wireless communication device 100 and the second wireless communication device 200 form a communication group, the first wireless communication device 100 can transmit data (video content, for example) directly to the second wireless communication device 200. In this case, the wireless communication devices are connected to each other, and video content stored in the first wireless communication device 100 can be displayed on the second wireless communication device 200. Known examples of communications standards for allowing wireless communication devices to communicate directly with one another include Wi-Fi Direct.

The first wireless communication device 100 is a portable telephone device (such as a wireless communication device having a verbal communication function and a data communication function), for example. The second wireless communication device 200 is a video viewing device (such as a television receiver with a built-in hard disk) that records or displays video content, for example. The third wireless communication device 300 is an information processing device (such as a notebook PC (Personal Computer)) that performs various kinds of information processing, for example. The fourth wireless communication device 400 is a portable information processing device (such as a smartphone having a verbal communication function and a data communication function), for example.

The first wireless communication device 100, the second wireless communication device 200, the third wireless communication device 300, and the fourth wireless communication device 400 can be connected to an access point (not shown) by using wireless communications, to transmit/receive various kinds of information. Here, the access point is an access point compliant with a wireless LAN standard such as IEEE802.11a/b/g/n. That is, with a router and an access point (or a product having a router including an access point, for example), a wireless LAN standardized by IEEE802.11a/b/g/n is realized.

Examples of data to be communicated among the wireless communication devices include music data of music and radio programs, image data of movies, television programs, video programs, photographs, documents, pictures, drawings, and the like, game data, or data of software and the like.

The wireless communication devices shown in FIG. 1 are merely examples, and this embodiment can also be applied to some other wireless communication devices. For example, this embodiment can be applied to an imaging device (such as a digital still camera or a digital video camera (a recorder with a camera, for example)) having a wireless communication function, and an audio output device (such as a portable music player) having a wireless communication function. Also, this embodiment can be applied to a display device (such as a digital photo frame) having a wireless communication function, and an electronic book reader having a wireless communication function, for example. This embodiment can also be applied to other information processing devices each having a wireless communication function, for example. Examples of information processing devices having a wireless communication function include home video processing devices (such as DVD recorders and video cassette recorders), PDAs (Personal Digital Assistants), home video game machines, electric household appliances, portable video processing devices, portable game machines, and the like. This embodiment can be applied to information processing devices (such as personal computers having no wireless communication functions) that can perform wireless communications when equipped with a wireless communication device having a wireless communication function, for example.

[Example Structure of a Wireless Communication Device]

Figure 2:
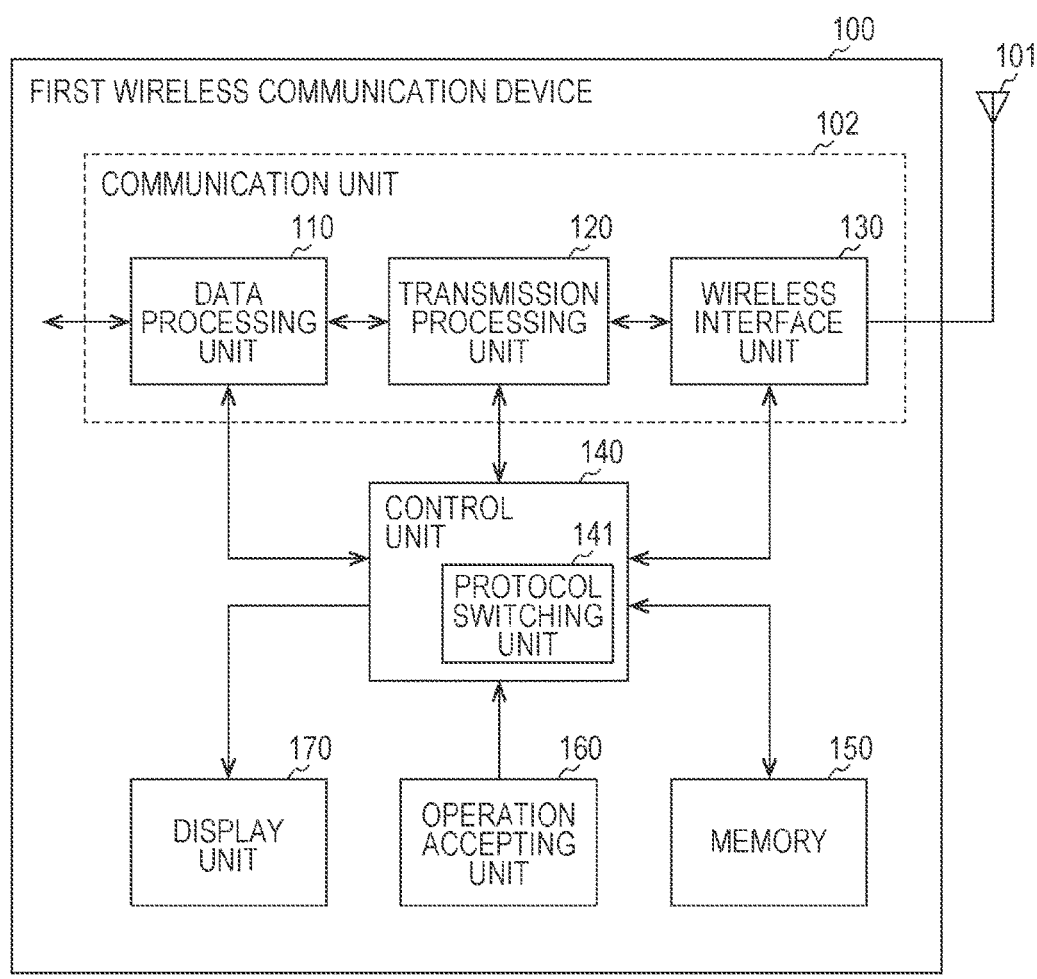
FIG. 2 is a block diagram showing an example functional structure of a first wireless communication device 100 in the first embodiment of the present technique.

FIG. 2 is a block diagram showing an example functional structure of a first wireless communication device 100 in the first embodiment of the present technique. The functional structures (functional structures related to wireless communications) of the second wireless communication device 200, the third wireless communication device 300, and the fourth wireless communication device 400 are substantially the same as the functional structure of the first wireless communication device 100, and therefore, explanation of them is omitted herein. Also, when the components of the respective wireless communication devices other than the first wireless communication device 100 are explained in the description below, the same reference numerals as those used for the first wireless communication device 100 will be used.

The first wireless communication device 100 includes an antenna 101, a data processing unit 110, a transmission processing unit 120, a wireless interface unit 130, a control unit 140, a memory 150, an operation accepting unit 160, and a display unit 170.

Under the control of the control unit 140, the data processing unit 110 processes various kinds of data. When a transmitting operation is performed, for example, the data processing unit 110 creates various kinds of data frames and data packets in accordance with a request from a higher layer, and supplies the data frames and packets to the transmission processing unit 120. When a receiving operation is performed, for example, the data processing unit 110 processes and analyzes various kinds of data frames and data packets supplied from the transmission processing unit 120.

The data processing unit 110 also functions as an image data processing unit that performs signal processing to process image data to be displayed on the display unit 170 or image data to be displayed on another wireless communication device. For example, the data processing unit 110 causes the display unit 170 to display an image via the control unit 140. The data processing unit 110 can also cause the display unit 170 to display an image without the intervention of the control unit 140.

Under the control of the control unit 140, the transmission processing unit 120 performs various transmission processes. When a transmitting operation is performed, for example, the transmission processing unit 120 performs a process to add various data headers and error detection codes such as FCSs (Frame Check Sequences) to packets generated by the data processing unit 110. The transmission processing unit 120 then supplies the processed data to the wireless interface unit 130. When a receiving operation is performed, for example, the transmission processing unit 120 analyzes the headers attached to various kinds of data frames supplied from the wireless interface unit 130. After confirming that there are no errors in the data frames based on the error detection codes, the transmission processing unit 120 supplies the various kinds of data frames to the data processing unit 110.

The wireless interface unit 130 is an interface that is connected to the other wireless communication devices to transmit/receive various kinds of information. When a transmitting operation is performed, for example, the wireless interface unit 130 generates a modulation signal of the frequency band of carrier waves from data received from the transmission processing unit 120, and transmits the generated modulation signal as a radio signal from the antenna 101. When a receiving operation is performed, for example, the wireless interface unit 130 down-converts a radio signal received by the antenna 101 into a bit stream, to decode various kinds of data frames.

As described above, the data processing unit 110, the transmission processing unit 120, and the wireless interface unit 130 function as a communication unit 102. The communication unit 102 performs a connected device discovery process before a wireless connection (a connection in the second layer) is established. This connected device discovery process is device discovery, for example. This device discovery is performed by adding device information and information indicating an associated specific application to a Probe Request or a Probe Response specified in the IEEE802.11 specification.

The communication unit 102 also performs an establishment process for establishing a wireless connection (an establishment process for establishing a connection in the second layer). In a case where the connected device discovered through the connected device discovery process is determined to be associated with a specific application, the communication unit 102 performs the establishment process by transmitting/receiving data including the information element (shown in FIG. 7) for designating the specific application.

The control unit 140 controls respective receiving operations and transmitting operations of the data processing unit 110, the transmission processing unit 120, and the wireless interface unit 130. For example, the control unit 140 performs operations, such as determination on the frequency to be used, creation of control messages, and interpretations of transmission commands and control messages. Examples of control messages include notification information such as beacons, received responses to beacons, Probe requests, and Probe responses. The control to be performed by the control unit 140 will be described later in detail, with reference to FIGS. 16 through 19.

The control unit 140 includes a protocol switching unit 141. The protocol switching unit 141 switches protocols in using inter-device wireless communications. The control unit 140 also performs control to transmit image data displayed on the display unit 170 to another wireless communication device, by using the protocol switched by the protocol switching unit 141. Meanwhile, the communication unit 102 receives image data to be displayed on the display unit 140, by using the protocol switched by the protocol switching unit 141.

The memory 150 functions as a work area for the data processing performed by the control unit 140, and as a storage medium storing various kinds of data. Also, various kinds of information (such as the information elements shown in FIGS. 10 through 12) to be included in the data to be transmitted to the wireless communication device serving as the peer are recorded in the memory 150. The peer list 180 shown in FIG. 3 is also recorded in the memory 150. The memory 150 may be a storage medium such as a nonvolatile memory, a magnetic disk, an optical disk, or an MO (Magneto-optical) disk. The nonvolatile memory may be an EEPROM (Electrically Erasable Programmable Read-Only Memory) or an EPROM (Erasable Programmable ROM), for example. The magnetic disk may be a hard disk or a circular magnetic disk, for example. The optical disk may be a CD (Compact Disc), a DVD-R (Digital Versatile Disc Recordable), or a BD (Blu-Ray Disc (a registered trade name)), for example.

The operation accepting unit 160 accepts an operation input from a user, and outputs operation information corresponding to the received operation input to the control unit 140. The operation accepting unit 160 may be a mouse, a keyboard, a touch panel, buttons, a microphone, switches, or a lever, for example. The operation accepting unit 160 also accepts an operation for transmitting/receiving various kinds of data to/from other wireless communication devices.

The display unit 170 is a display unit that displays various kinds of information (such as text information and time information) under the control of the control unit 140. The display unit 170 displays various kinds of information (such as the display screen shown in FIG. 4) for transmitting/receiving various kinds of data to/from another wireless communication device, for example. The display unit 170 also displays image data processed by the data processing unit 110. The display unit 170 may be a display panel such as an organic EL (Electro Luminescence) panel or an LCD (Liquid Crystal Display) panel. The operation accepting unit 160 and the display unit 170 can be integrally formed with a touch panel through which a user can input an operation by touching the display surface with a finger or bringing a finger close to the display surface.

[Example Structure of the Peer List]

FIG. 3 is a diagram schematically showing an example structure of a peer list 180 stored in the memory 150 in the first embodiment of the present technique.

The peer list 180 is formed with terminal identification information 181, MAC (Media Access Control) addresses 182, terminal types 183, and specific application association 184. These pieces of information are acquired from the respective wireless communication devices through execution of Device Discovery and the like, and are sequentially recorded by the control unit 140.

The terminal identification information 181 is the identification information (such as device specific IDs) for identifying the respective wireless communication devices. In FIG. 3, the terminal identification information is shown as "AAAA", "BBBB", and "CCCC", and the names of the corresponding wireless communication devices are shown in parentheses, for ease of explanation.

The MAC addresses 182 are physical addresses uniquely assigned to the respective wireless communication devices.

The terminal types 183 are the information indicating the types of the respective wireless communication devices.

The specific application association 184 is information indicating whether the respective wireless communication devices are associated with a specific application. In FIG. 3, the wireless communication devices associated with a specific application are accompanied by "associated", and the names of the associated specific applications are shown in parentheses, for ease of explanation. The wireless communication devices not associated with any specific application are accompanied by "N/A".

[Example Display Screen to be Used in the Case of a Wireless Connection with Another Wireless Communication Device]

Figure 4:
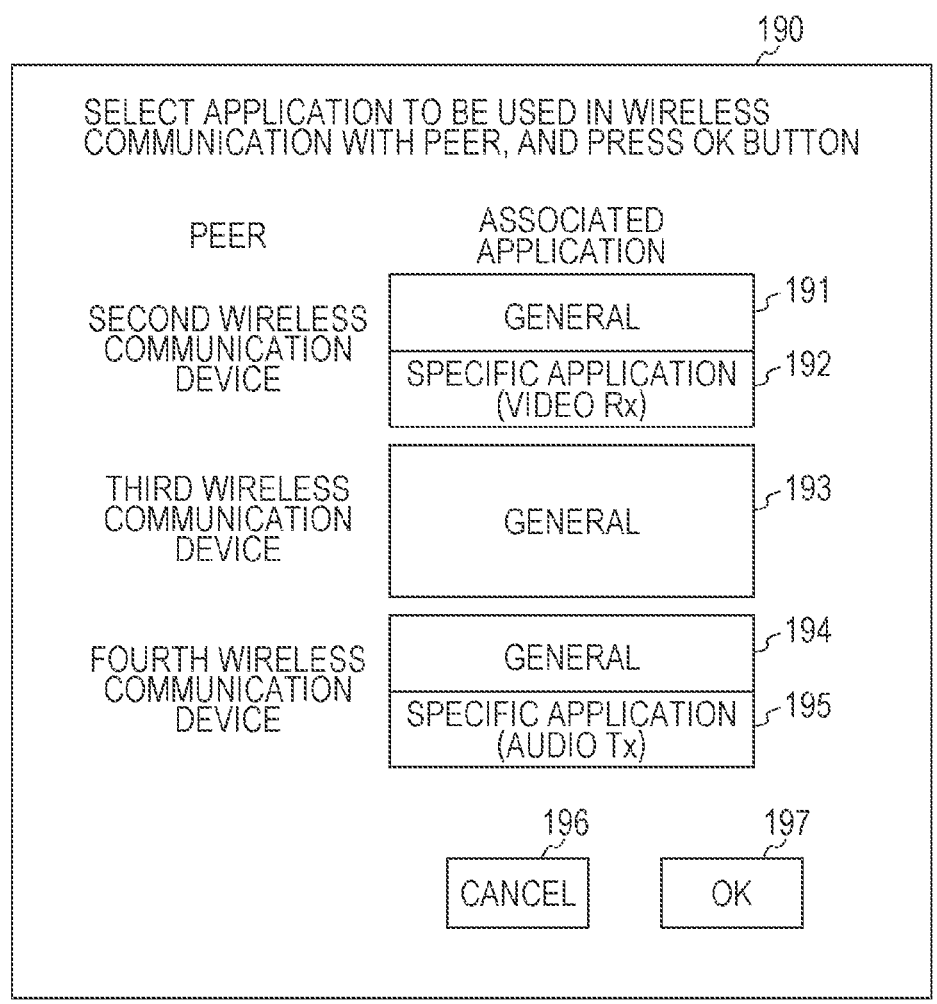
FIG. 4 is a diagram showing an example display screen (a connection detail select screen 190) displayed on the display unit 170 of the first wireless communication device 100 in the first embodiment of the present technique.

FIG. 4 is a diagram showing an example display screen (a connection detail select screen 190) displayed on the display unit 170 of the first wireless communication device 100 in the first embodiment of the present technique.

The connection detail select screen 190 shows application-to-use select buttons 191 through 195, a cancel button 196, and an OK button 197.

The application-to-use select buttons 191 through 195 are buttons for selecting a wireless communication device to be the peer, and the application to be used in connecting to this wireless communication device. The application-to-use select buttons 191 through 195 are displayed based on the details (such as the terminal identification information 181 and the specific application association 184) in the peer list 180 shown in FIG. 3, for example.

When the OK button 197 is pressed after one of the application-to-use select buttons 191 through 195 is pressed, the control unit 140 performs control to execute the application corresponding to the pressed button.

To cancel an operation corresponding to one of the application-to-use select buttons 191 through 195 after the one application-to-use select button is pressed, the cancel button 196 is pressed.

[Example of a Basic Operation of a Wireless Communication Device on which the Present Technique is Based]

The following is a description of an example of a basic operation on which the present technique is based.

First, an example of wireless packet transmission/reception (FIGS. 5 and 6) to be performed to establish a P2P (Peer to Peer) connection and operate a specific application will be described below.

Next, an example of wireless packet transmission/reception (FIG. 8) to be performed, prior to a connection in the second layer, to designate a specific application to be used, establish a P2P connection, and operate a specific application will be described.

Figure 5:
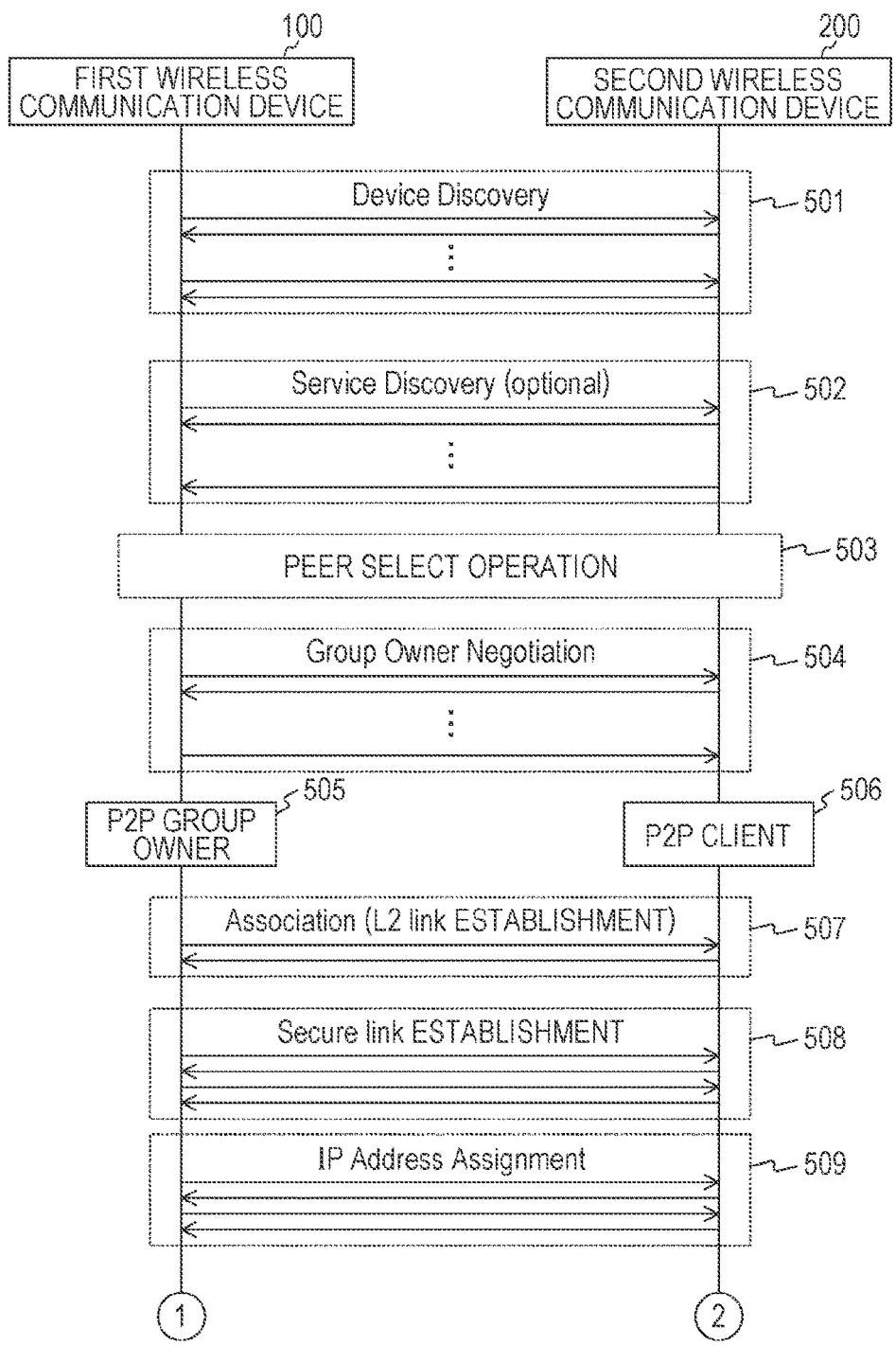
FIG. 5 is a sequence chart showing an example communication process to be performed by each device on which the present technique is based.
Figure 6:
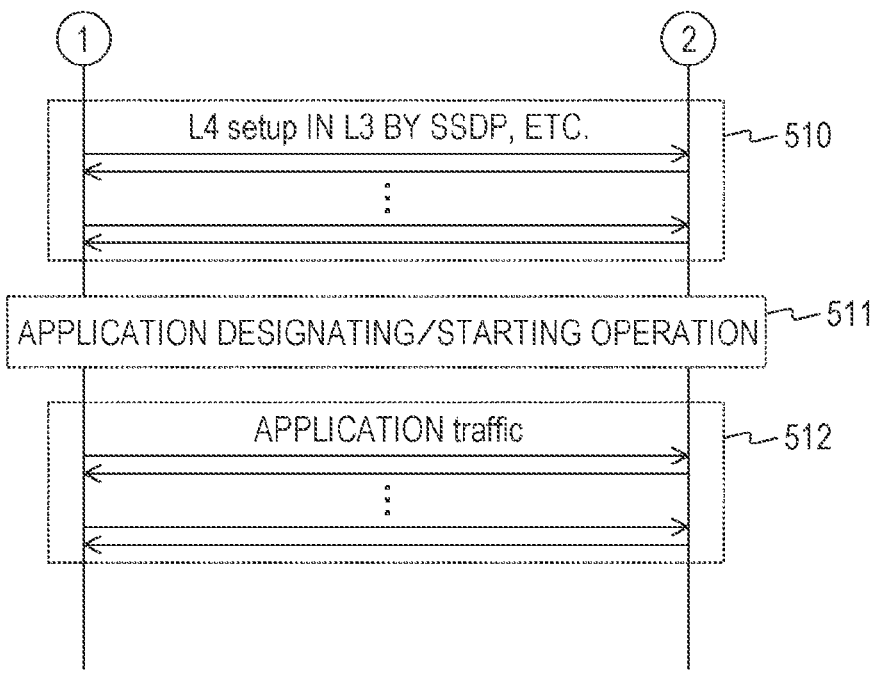
FIG. 6 is a sequence chart showing an example communication process to be performed by each device on which the present technique is based.

After that, an example of wireless packet transmission/reception (FIG. 9) to be performed to start a specific application after establishment of a connection in the second layer in a case where the example illustrated in FIGS. 5 and 6 is combined with the example illustrated in FIG. 8 will be described.

[Example Communication at a Start of Operation of a Specific Application]

FIGS. 5 and 6 are a sequence chart showing an example communication process to be performed by each device on which the present technique is based. Specifically, an example of procedures for establishing a direct connection that leads to a connection compliant with the Wi-Fi Direct standard (also called Wi-Fi P2P), which has been set by the Wi-Fi Alliance, is described.

According to Wi-Fi Direct, wireless communication devices detect the existence of one another (Device Discovery and Service Discovery). Devices to be connected are then selected, and a direct connection is established between the selected devices by performing device authentication through WPS (Wi-Fi Protected Setup). According to Wi-Fi Direct, wireless communication devices form a communication group, with one of the wireless communication devices being determined to serve as the group owner, some of the wireless communication devices being determined to serve as clients.

In the example communication process illustrated in FIGS. 5 and 6, however, part of packet transmission/reception is not shown. For example, at the time of the first connection, exchanges of the packets for using WPS are necessary, and transmission/reception of an Authentication Request/Response also involves exchanges of packets. However, FIGS. 5 and 6 do not show such exchanges of packets, and do only show the second and later connections.

Although FIGS. 5 and 6 show an example communication process to be performed between the first wireless communication device 100 and the second wireless communication device 200, the same communication process can be performed between other wireless communication devices.

First, Device Discovery is conducted between the first wireless communication device 100 and the second wireless communication device 200 (501). For example, the first wireless communication device 100 transmits a Probe request (a response request signal), and receives a Probe response (a response signal) to the Probe request from the second wireless communication device 200. With that, the first wireless communication device 100 and the second wireless communication device 200 can discover the existence of each other. Through the Device Discovery, the device name and the type (TV, PC, smartphone, or the like) of each other can be obtained.

Service Discovery is then conducted between the first wireless communication device 100 and the second wireless communication device 200 (502). For example, the first wireless communication device 100 transmits Service Discovery Query so as to inquire about the service with which the second wireless communication device 200, which has been discovered through the Device Discovery, is associated. The first wireless communication device 100 then receives Service Discovery Response from the second wireless communication device 200, and obtains the service with which the second wireless communication device 200 is associated. That is, the service and the like the other device can execute can be obtained through the Service Discovery. The service the other device can execute may be a service or a protocol (such as DLNA (Digital Living Network Alliance) or DMR (Digital Media Renderer)), for example.

A user then performs an operation to select the peer (a peer select operation) (503). This peer select operation is performed in only one of the first wireless communication device 100 and the second wireless communication device 200 in some cases. For example, a peer select screen is displayed on the display unit 170 of the first wireless communication device 100, and the second wireless communication device 200 is selected as the peer on the peer select screen through a user operation.

After the peer select operation is performed by the user (503), Group Owner Negotiation is conducted between the first wireless communication device 100 and the second wireless communication device 200 (504). In the example illustrated in FIGS. 5 and 6, as a result of the Group Owner Negotiation, the first wireless communication device 100 becomes a group owner 505, and the second wireless communication device 200 becomes a client 506.

Respective procedures (507 through 510) are then carried out between the first wireless communication device 100 and the second wireless communication device 200, to establish a direct connection. Specifically, Association (L2 (second layer) link establishment) (507) and Secure link establishment (508) are sequentially conducted. Also, IP Address Assignment (509) and L4 setup in L3 by SSDP (Simple Service Discovery Protocol) or the like (510) are sequentially conducted. It should be noted that L2 (layer 2) means the second layer (data link layer), L3 (layer 3) means the third layer (network layer), and L4 (layer 4) means the fourth layer (transport layer).

The user then performs a specific application designating or starting operation (an application designating/starting operation) (511). This application designating/starting operation is performed in only one of the first wireless communication device 100 and the second wireless communication device 200 in some cases. For example, an application designating/starting operation screen (the connection detail select screen 190 shown in FIG. 4, for example) is displayed on the display unit 170 of the first wireless communication device 100, and a specific application is selected on this application designating/starting operation screen through a user operation.

After the user performs the application designating/starting operation (511), the specific application corresponding to this application designating/starting operation is executed between the first wireless communication device 100 and the second wireless communication device 200 (512).

In an example case, a connection between an AP (Access Point) and a STA (Station) is established within an older specification than the Wi-Fi Direct standard (a specification standardized by IEEE802.11). In this case, there is no way to recognize to which device a connection is to be established prior to a connection in the second layer (prior to association as specified in IEEE802.11).

According to Wi-Fi Direct, on the other hand, information about a peer can be obtained when candidate peers are searched in Device Discovery and Service Discovery (option), as shown in FIGS. 5 and 6. The information about a peer is the type of the fundamental device, the associated specific application, or the like. The user can select a peer based on the obtained information about the peer.

This mechanism can be extended to realize a wireless communication system that designates a specific application and selects a peer prior to establishment of a connection in the second layer, and causes the specific application to automatically start after the selection. An example of a sequence to establish a connection in such a case is shown in FIG. 8. An example structure of the format of a frame to be transmitted/received in this communication process is shown in FIG. 7.

[Example Structure of a Frame Format]

Figure 7:
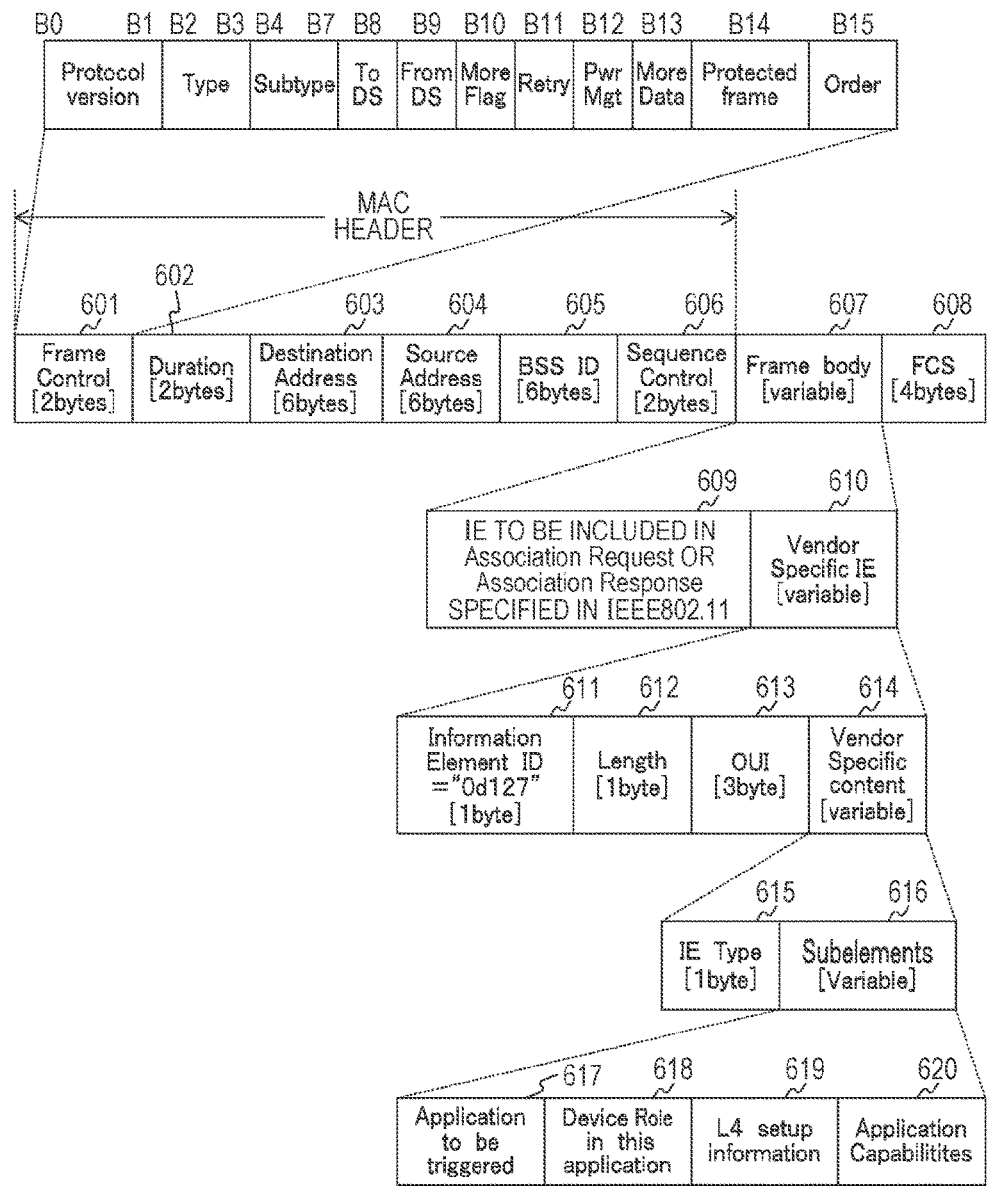
FIG. 7 is a diagram schematically showing an example structure of the format of a frame to be transmitted/received in a communication process by each device on which the present technique is based.

FIG. 7 is a diagram schematically showing an example structure of the format of a frame to be transmitted/received in a communication process by each device on which the present technique is based. That is, FIG. 7 shows an example structure of a MAC frame for establishing a connection in the second layer. Specifically, the frame format is an example of the frame format of an Association Request/Response (527) for realizing the sequence shown in FIG. 8.

It should be noted that the MAC header is formed with Frame Control (601) through Sequence Control (606). When Association Request is transmitted, B3B2="0b00" and B7B6B5B4="0b0000" are set in Frame Control (601). When Association Response is encapsulated, B3B2="0b00" and B7B6B5B4="0b0001" are set in Frame Control (601). Here, "0b00" means "00" in binary, "0b0000" means "0000" in binary, and "0b0001" means "0001" in binary.

The MAC frame shown in FIG. 7 basically has the Association Request/Response frame format specified in sections 7.2.3.4 and 7.2.3.5 in the IEEE802.11-2007 specification. However, the MAC frame includes not only an Information Element (hereinafter referred to simply as IE) defined in the IEEE802.11 specification but also a uniquely-extended IE.

To indicate Vendor Specific IE (610), "127" is set as a decimal number in IE Type (Information Element ID (611)). In this case, according to section 7.3.2.26 in the IEEE802.11-2007 specification, a Length field (612) and an OUI field (613) come after Information Element ID (611), followed by vendor specific content (614).

In the vendor specific content (614), a field indicating the type of the vendor specific IE (IE type (615)) is first set. Subelements (616) can come after IE Type (615).

Subelements (616) may include the name of the specific application to be used (617) and the role of the device during operation of the specific application (618). Subelements (616) may also include information about the specific application or information such as the port number to be used for controlling the specific application (information for L4 setup) (619), and information about the capabilities in the specific application (Capability information). Here, the Capability information is the information for detecting compatibility with audio transmission/reproduction, compatibility with video transmission/reproduction, and the like when the designated specific application is DLNA, for example.

[Example Communication at a Start of Operation of a Specific Application]

Figure 8:
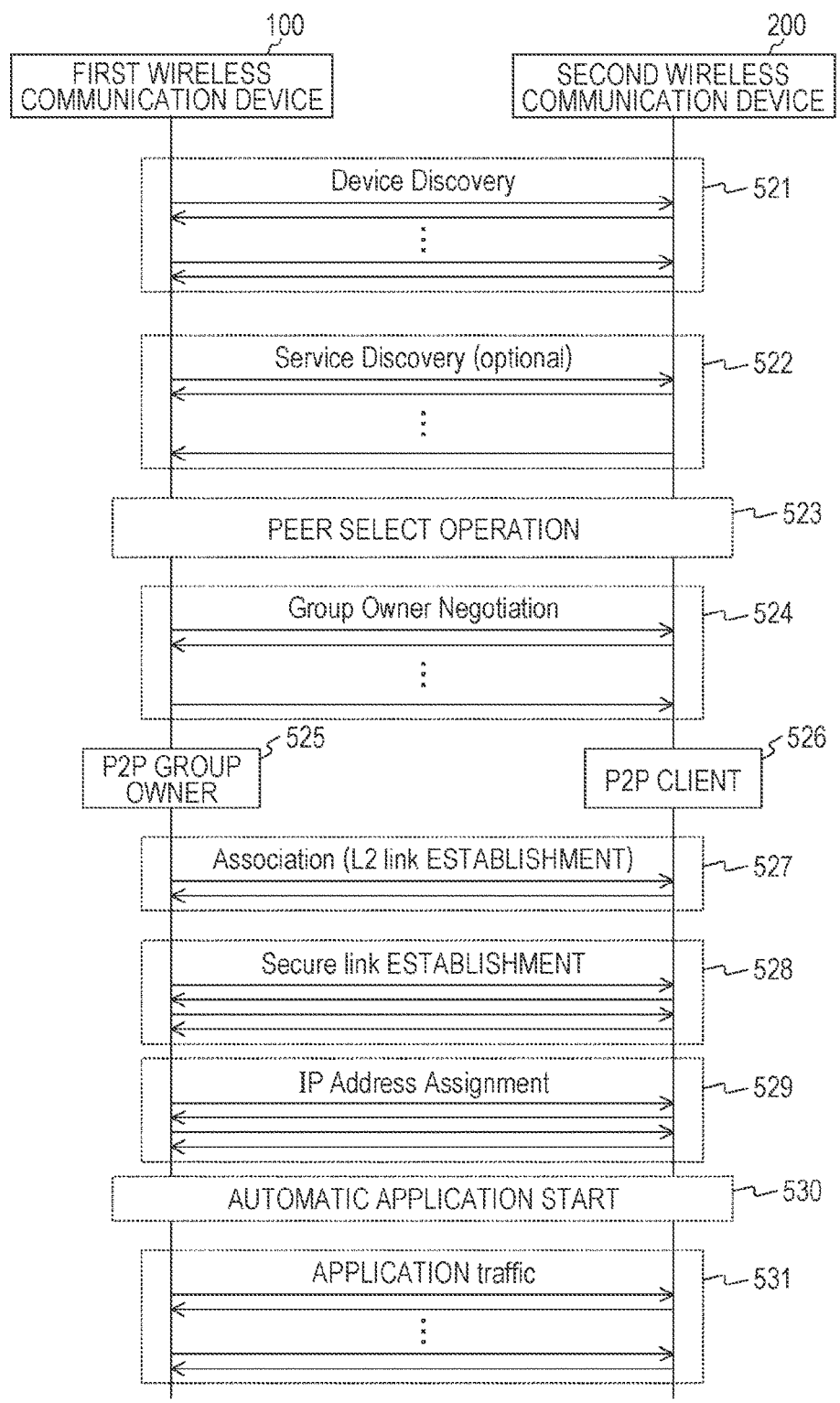
FIG. 8 is a sequence chart showing an example communication process to be performed by each device on which the present technique is based.

FIG. 8 is a sequence chart showing an example communication process to be performed by each device on which the present technique is based. FIG. 8 illustrates an example communication process to be performed to designate a specific application and select a peer prior to establishment of a connection in the second layer, and cause the specific application to automatically start after the selection. The sequence chart shown in FIG. 8 is a modification formed by partially modifying the sequence chart shown in FIGS. 5 and 6, and therefore, explanation of the same aspects as those in FIGS. 5 and 6 will not be made below.

First, Device Discovery is conducted between the first wireless communication device 100 and the second wireless communication device 200 (521).

Here, the Probe request (the response request signal)/Probe response (the response signal) used in the stage of device discovery can include the vendor specific IE (610) shown in FIG. 7. Accordingly, the association with a specific application and the capability information indicating the role the device can play during operation of the specific application can be acquired in the stage of Device Discovery. Here, the role the device can play during operation of the specific application is the role of a server/client, a master/slave, a source/sink, or the like.

Service Discovery is then conducted between the first wireless communication device 100 and the second wireless communication device 200 (522).

Here, detailed capability information about the specific application (such as information about the details of the associated media format in the case of DLNA) can be included in the stage of Service Discovery. Accordingly, the detailed capability information in the specific application can be acquired.

The respective procedures (523 and 524) shown in FIG. 8 are equivalent to the respective procedures 503 and 504 shown in FIG. 5.

Respective procedures (527 through 529) are then carried out between the first wireless communication device 100 and the second wireless communication device 200, to establish a direct connection.

Here, the frame (MAC frame) shown in FIG. 7 is transmitted/received as an Association Request/Response in the stage of Association (527). Accordingly, the specific application to be used after establishment of a connection in the second layer can be designated in the stage (527) of an exchange of packets (Association Request/Response) for establishing the connection in the second layer. Also, the information necessary in using the specific application can be included in the stage (527).

As described above, in the example illustrated in FIG. 8, a different information exchange from that in the example illustrated in FIGS. 5 and 6 is performed in the stages of device discovery (521) and Service Discovery (522). With this difference, the user can implicitly designate the specific application to be used after establishment of a connection in the second layer by selecting a device prior to the connection in the second layer.

Also, with the difference in the stage (527) of the exchange of a packet for establishing the connection in the second layer from the example illustrated in FIGS. 5 and 6, the application to be used can be automatically determined, and the number of steps to be taken by the user can be reduced by one.

Further, compared with the example illustrated in FIGS. 5 and 6, the stage (510) of L4 setup in L3 by SSDP or the like can be skipped. Accordingly, the user can feel that the time until the application start is shortened.

An example case where a specific application is started by using the mechanism illustrated in FIG. 8 after establishment of a connection in the second layer is now described. In this case, the mechanism illustrated in FIG. 8 implicitly designates the specific application to be used in the vendor specific IE (610 shown in FIG. 7) included in the Association Request/Response. The information necessary for operating the specific application is also included in the vendor specific IE (610). As a result, a problem arises in the case where the specific application is started by using the mechanism illustrated in FIG. 8 after establishment of a connection in the second layer. This example is illustrated in FIG. 9.

[Example Communication at a Start of Operation of a Specific Application]

Figure 9:
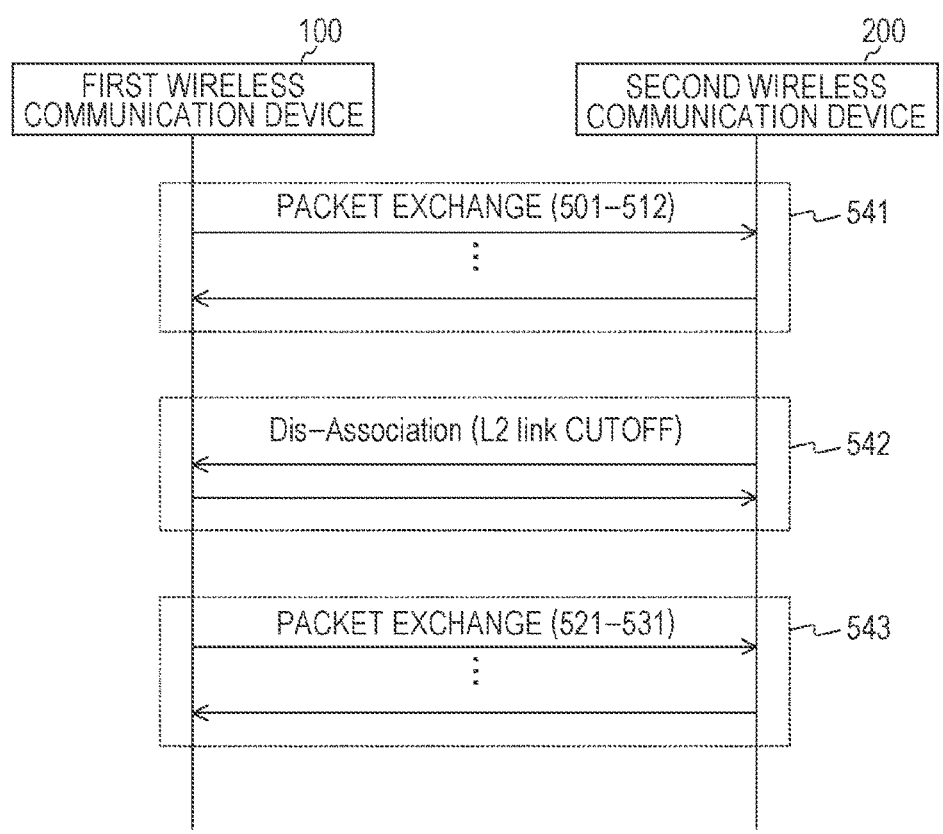
FIG. 9 is a sequence chart showing an example communication process to be performed by each device on which the present technique is based.

FIG. 9 is a sequence chart showing an example communication process to be performed by each device on which the present technique is based. FIG. 9 illustrates an example communication process to be performed in a case where a specific application is started by using the mechanism illustrated in FIG. 8 after establishment of a connection in the second layer.

The sequence chart shown in FIG. 9 is an example formed by combining the sequence chart shown in FIGS. 5 and 6 with the sequence chart shown in FIG. 8, and therefore, explanation of the same aspects as those in FIGS. 5, 6, and 8 will not be made below. Specifically, in the communication process indicated by a rectangle 541, the respective procedures (501 through 512) shown in FIGS. 5 and 6 are carried out. In the process indicate by a rectangle 543, the respective procedures (521 through 531) shown in FIG. 8 are carried out.

An example case where a specific application is started after a connection in the second layer is established, and another application is operated (541), as shown in FIGS. 5 and 6, is now described. In this case, a process to temporarily cut off the L2 (second layer) link is performed by an exchange of Disassociation Request/Response (542), and a re-connection is established (543) by using the procedures shown in FIG. 8.

As described above, when a specific application is started, Device Discovery, a second-layer connection process, a secure link establishment process, an IP address assignment process, and the like are again performed. Therefore, collisions due to use of a resource in a wireless zone increase, and the waiting time of the user increases with the time required for those processes.

So as to avoid second-layer link cutoff, a protocol in L3/L4 such as SDP may be used in switching to a specific application as in a case where another application is started, as shown in FIGS. 5 and 6, for example.

In this case, however, the protocol not required in operating the specific application has to be supported, as shown in FIG. 8. Further, an application connection request is issued from a different layer in this case. Therefore, implementation of the application trigger portion might become complicated. For example, when a specific application is operated by the mechanism illustrated in FIG. 8, a trigger for the specific application is issued from the second layer. When a specific application is started by reusing the existing L2 (second layer) link, on the other hand, a protocol of L3/L4 such as SDP is used. When a protocol of L3/L4 such as SDP is used, a trigger for a specific application is issued from L3/L4, and an connection management entity should be prepared for more than one layer. As a result, implementation might become complicated.

In view of this, the first embodiment of the present technique suggests an example where a specific application can be readily used even after establishment of a connection in the second layer.

[Example Structure of a Frame Format]

Figure 10:
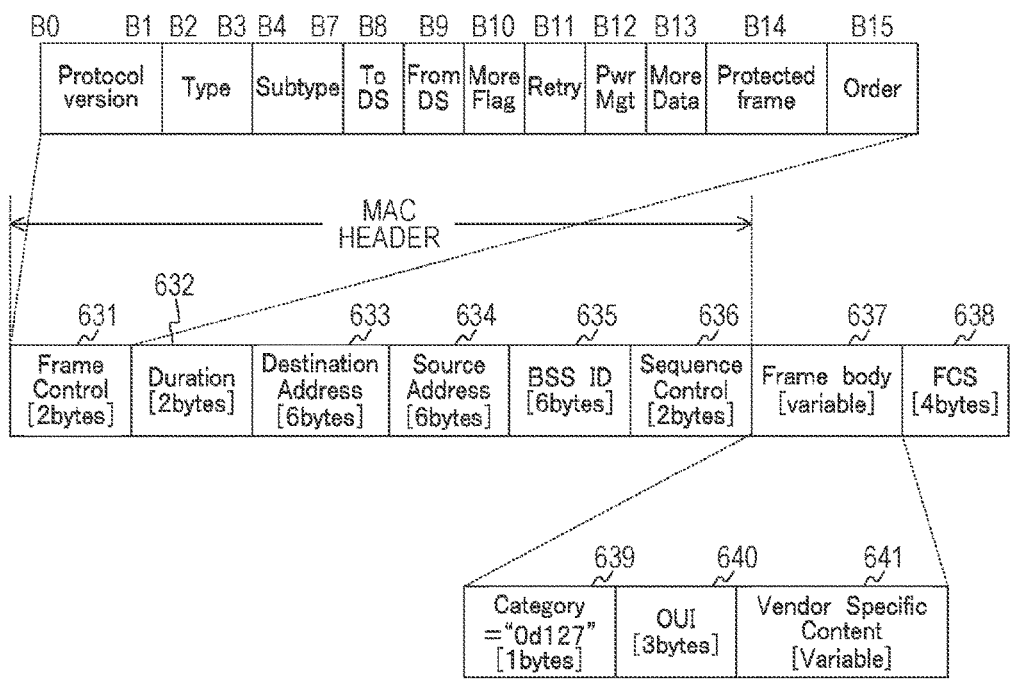
FIG. 10 is a diagram schematically showing an example structure of the format of a frame to be transmitted/received in a communication process between respective devices in the first embodiment of the present technique.

FIG. 10 is a diagram schematically showing an example structure of the format of a frame to be transmitted/received in a communication process between respective devices in the first embodiment of the present technique. That is, FIG. 10 shows an example structure of an action frame that triggers a start of a specific application (a specific application start) after establishment of a connection in the second layer. Specifically, an example structure of a vendor specific action frame at the MAC layer level is shown.

Here, a vendor specific action frame is an action frame containing the vendor specific IE.

When a packet exchange is performed to start a specific application, necessary information can be exchanged by using the action frame defined in the IEEE802.11-2007 specification.

It should be noted that the MAC header is formed with Frame Control (631) through Sequence Control (636). In Frame Control (631) in the MAC header, B3B2="0b00" and B7B6B5B4="0b1101" are set. With this setting, this frame can be presented as an action frame classified as a management frame.

Also, "127" is set as a decimal number in the Category field (639) in the frame body (637), to indicate that this action frame is a vendor specific frame. In this case, according to section 7.4.5 in the IEEE802.11-2007 specification, an OUI field (640) and a Vendor Specific Content field (641) come after the Category field (639).

Figure 16:
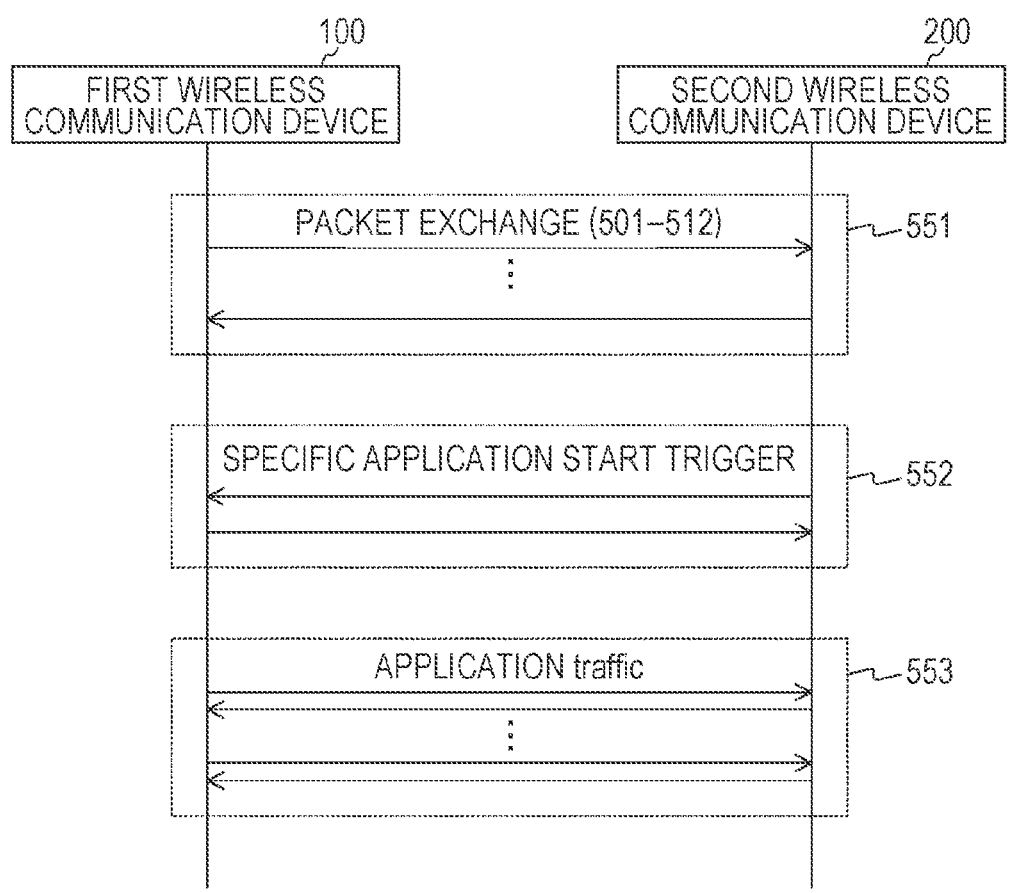
FIG. 16 is a sequence chart showing an example communication process to be performed by each device in the first embodiment of the present technique.

Various kinds of information are set in the vendor specific content field (641), so that the operation sequence shown in FIG. 16 can be realized. Here, the various kinds of information include the name of the specific application to be used, the role of the device during operation of the specific application, and the like. The various kinds of information also include information about the specific application or information such as a port number to be used for controlling the specific application (information for L4 setup), and the Capability information in the specific application, for example.

While there may be various methods for implementing the Vendor Specific Content field (641), the following two example structures (shown in FIGS. 11 and 12) are used in the first embodiment of the present technique.

[Example Structure of a Frame Format]

Figure 11:
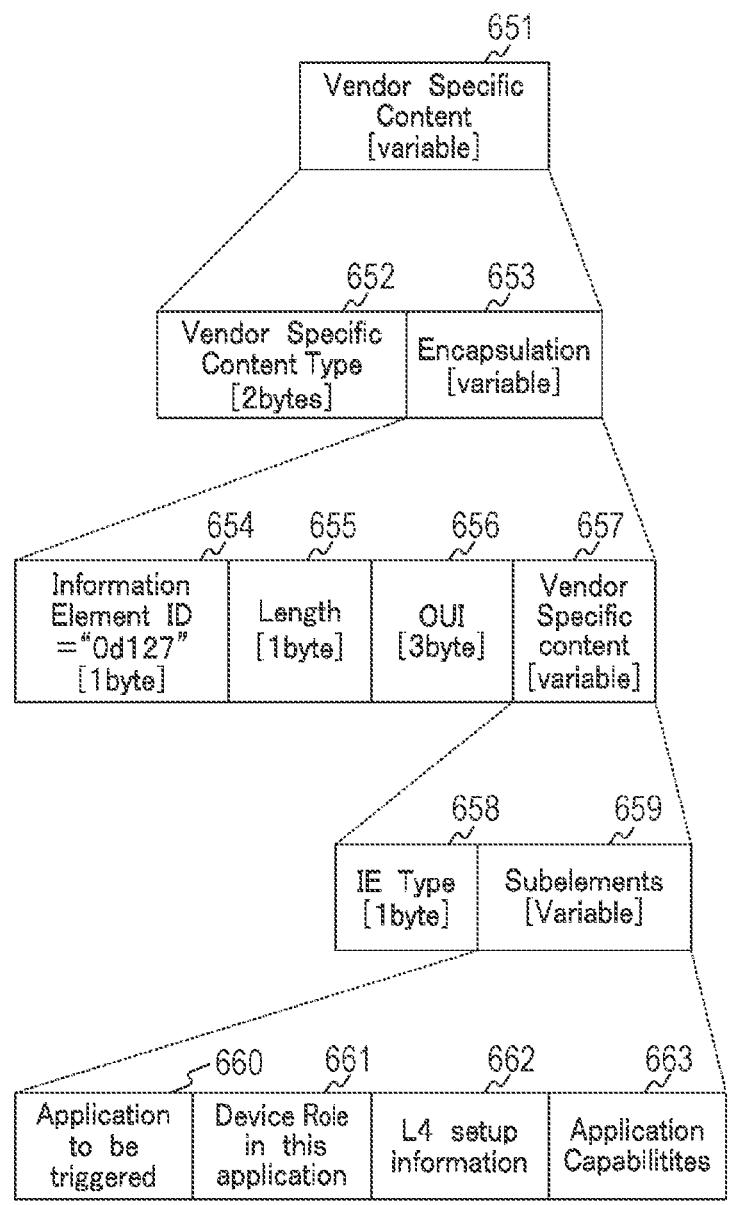
FIG. 11 is a diagram schematically showing an example structure of the format of a frame to be transmitted/received in a communication process between respective devices in the first embodiment of the present technique.

FIG. 11 is a diagram schematically showing an example structure of the format of a frame to be transmitted/received in a communication process between respective devices in the first embodiment of the present technique. Specifically, FIG. 11 shows an example case where a vendor specific Information Element is used as the Vendor Specific Content of the vendor specific action frame shown in FIG. 10. In short, FIG. 11 shows a configuration method using an information element (IE).

Here, the Vendor Specific Content is preferably divided into more than one portion, so as to indicate for what purpose the vendor specific action frame is to be used. For example, the Vendor Specific Content is preferably divided into the portion of vendor specific content type (652) and an information element storage portion (653) that follows. That is, the vendor specific content type (652) can indicate for what purpose the vendor specific action frame is to be used. In this manner, the type information portion (652) and the information element portion (653) are formed in the action frame (vendor specific action frame).

In the first embodiment of the present technique, the type of each frame is supposedly written in the vendor specific content type (652). The type may be the type of a request frame for indicating to the peer a specific application start or the type of a response frame for responding to the indication, while there is a P2P L2 (second layer) link, for example.

In the information element storage portion (653), a Length field (655) and an OUI filed (656) follow, as specified in section 7.3.2.26 in the IEEE802.11-2007 specification. Vendor specific content (657) comes after the OUI field (656).

The vendor specific content (657) is divided into an information element type (658) and subelements (659) that constitute the information element. The subelements portion (659) is further divided into subelements (660 through 663).

The type portion (658) contains information indicating that the information element is for starting a specific application, and the subelements portion (659) contains various kinds of information. The various kinds of information in the subelements portion (659) include the name of the specific application to be used (660) and the role of the device during operation of the specific application (661). The various kinds of information also include information about the specific application or information such as a port number to be used for controlling the specific application (information for L4 setup) (662), and the Capability information (663) in the specific application. The Capability information is the information indicating compatibility with audio transimssion/reproduction, compatibility with video transmission/reproduction, and the like when the designated specific application is DLNA, for example. The various kinds of information contained in the subelements portion (659) will be described later in detail, with reference to FIG. 13.

Other than the above, the specific application to be started may be designated in accordance with the type of information element in some classification process, for example. In this case, the subelement that designates the type of the specific application and triggers a start is unnecessary.

For example, the transmitting side (such as the first wireless communication device 100) transmits an action frame that includes such an information element and requests a start of a specific application to the receiving side (such as the second wireless communication device 200). Upon receipt of the action frame, the receiving side returns an action frame as a response including the corresponding information element (a response to the action frame requesting a start of a specific application). By transmitting/receiving an action frame in this manner, the intentions of the transmitting side and the receiving side can be matched, and a specific application can be automatically started at both sides. Accordingly, operation of a specific application can be started based on the control information in the L2 (second layer) link.

Here, a role can be designated in a subelement in the information element in the response action frame to be returned. In a case where the role of the peer is designated as "server" in the request, the role of a client is preferably designated accordingly in a subelement in the information element in the response action frame to be returned.

By another implementation method, a predetermined portion may be encapsulated as the vendor specific content (641) shown in FIG. 10. The predetermined portion to be encapsulated and transmitted is the frame body portion of an association request frame or an association response frame containing a specific information element. An example structure of the frame format according to this implementation method is shown in FIG. 12.

[Example Structure of a Frame Format]

Figure 12:
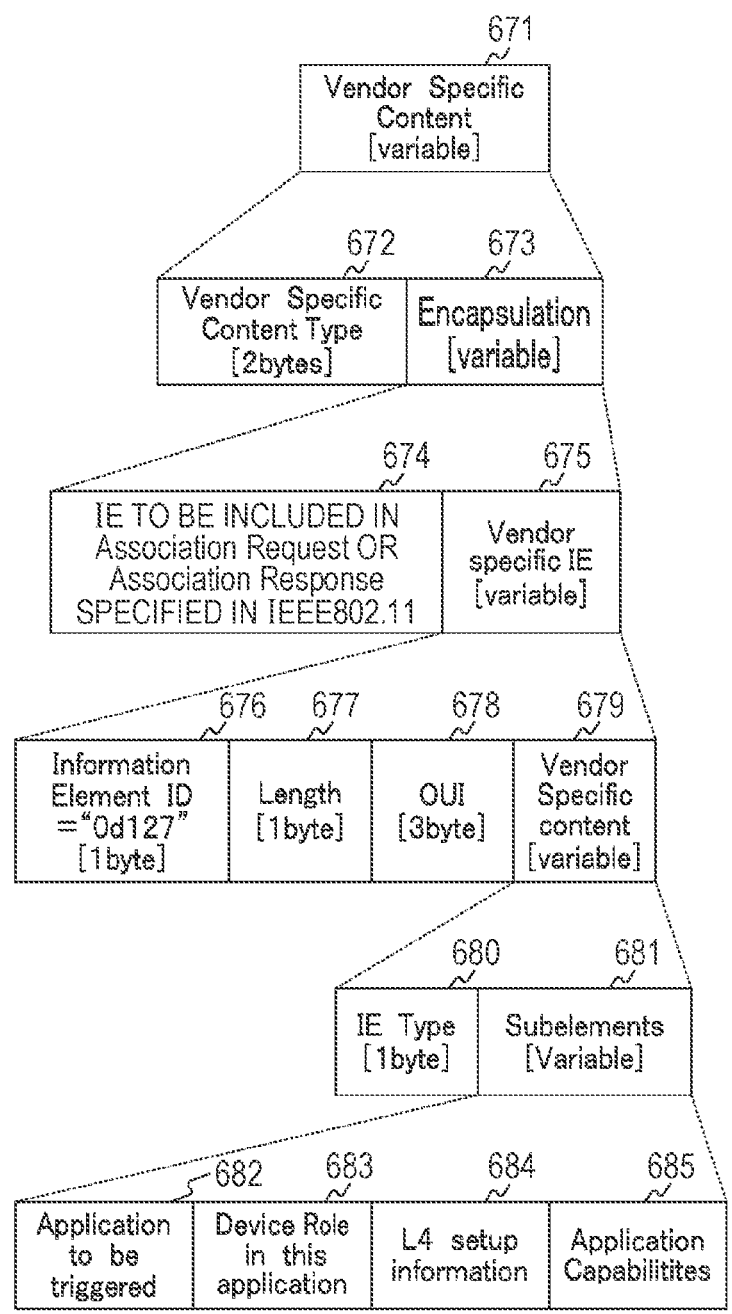
FIG. 12 is a diagram schematically showing an example structure of the format of a frame to be transmitted/received in a communication process between respective devices in the first embodiment of the present technique.

FIG. 12 is a diagram schematically showing an example structure of the format of a frame to be transmitted/received in a communication process between respective devices in the first embodiment of the present technique. Specifically, FIG. 12 shows an example case where association is used as the Vendor Specific Content of the vendor specific action frame shown in FIG. 10.

Here, the Vendor Specific Content is preferably divided into more than one portion, so as to indicate for what purpose the vendor specific action frame is to be used, as in the example illustrated in FIG. 11. For example, the Vendor Specific Content is preferably divided into the portion of vendor specific content type (672) and an information element storage portion (673) encapsulating the frame that follows. That is, the vendor specific content type (672) can indicate for what purpose the vendor specific action frame is to be used.

In the first embodiment of the present technique, the type of each frame is supposedly written in the vendor specific content type (672). The type may be the type of an action frame formed by encapsulating an association request frame for indicating to the peer a specific application start, while there is a P2P L2 (second layer) link, for example. Alternatively, the type may be the type of an action frame formed by encapsulating an association response frame for responding to the association request frame.

The information element storage portion (673) that encapsulates a frame stores the body portion (675) of an association request frame or an association response frame for responding to the association request frame.

The format of the body portion (675) of an association request frame or an association response frame to be encapsulated has the same structure as the frame body shown in FIG. 7. The format of the body portion (675) is equivalent to that shown in FIG. 11, and the information element for starting a specific application in the body portion (675) is also equivalent to that shown in FIG. 11. Therefore, detailed explanation of them is not repeated herein.

As described above, an association request frame to which the information element for starting a specific application is added is encapsulated into an action frame, and are then transmitted to the peer. With that, a request to start a specific application can be transmitted to the peer, while an existing L2 (second layer) link is maintained. Upon receipt of the request, the peer can encapsulate an association response frame to which the information element for starting the specific application is added into an action frame, and return a response. With that, the intentions of the transmitting side and the receiving side can be matched, and a specific application can be automatically started at both sides. Accordingly, operation of a specific application can be started based on the control information in an existing L2 (second layer) link.

[Example Information Recorded in the Subelements]

FIG. 13 is a diagram showing an example of the information element to be transmitted/received in a communication process between respective communication devices in the first embodiment of the present technique. This information element is the subelements portion (659) shown in FIG. 11, or the subelements portion (681) shown in FIG. 12.

In FIG. 13, an application (such as DLNA) using Wi-Fi CERTIFIED Miracast and P2P is shown as an example application, and respective information elements are classified into application types 686. It should be noted that Wi-Fi CERTIFIED Miracast is a mirroring technique of transmitting sound and display video data reproduced in one terminal to the other terminal, and causing the other terminal to output the sound and video data likewise, using a technique such as Wi-Fi Direct or TDLS. An example of an image displayed by Wi-Fi CERTIFIED Miracast will be described later in detail, with reference to FIG. 15.

The names of associated applications (specific applications) are stored into Application to be triggered (687). For example, a case where the application type 686 is Wi-Fi CERTIFIED Miracast is now described. In this case, the information to be stored in Application to be triggered (687) can be designated in IE Type (658) shown in FIG. 11. Accordingly, storing information into Application to be triggered (687) can be skipped. In a case where the application type 686 is an application that uses P2P, a level such as "application that uses P2P" can be designated in IE Type (658) shown in FIG. 11. Therefore, in a case where the application type 686 is an application that uses P2P, the name of an associated application (specific application) is stored into Application to be triggered (687).

Meanwhile, information about the role of the first wireless communication device 100 is stored into Device Role in this application (688). In a case where the application type 686 is Wi-Fi CERTIFIED Miracast, for example, information indicating whether the role of the first wireless communication device 100 is Source or is Sink is stored. That is, information about Source or Sink compliant with the Wi-Fi Display specification is stored as the information about the role of the first wireless communication device 100. Source and Sink will be described later in detail, with reference to FIGS. 14A, 14B, 14C and 14D. An example case where the application type 686 is an application that uses P2P is also described. In this case, information indicating whether the role of the first wireless communication device 100 is DMC (Digital Media Controller) or is DMR (Digital Media Renderer) is stored.

Information about the fourth layer (information about a L4 link) is stored in L4 setup information (689). In a case where the application type 686 is Wi-Fi CERTIFIED Miracast, for example, information about RTSP specified in the Wi-Fi Display specification is stored. Also, in a case where the application type 686 is Wi-Fi CERTIFIED Miracast, for example, information about the port number used in RTSP is stored. At least one piece of the information about RTSP and the information about the port number may be stored. In a case where the application type 686 is an application that uses P2P, for example, information about the control protocol compatible with this application is stored. Also, in a case where the application type 686 is an application that uses P2P, for example, information about the port number used in the control protocol compatible with this application is stored. At least one piece of the information about the control protocol and the information about the port number may be stored.

Capability information is stored into Application Capabilities (690). In a case where the application type 686 is Wi-Fi CERTIFIED Miracast, for example, content protection compatibility information is stored. This content protection compatibility information is information about the existence or non-existence of compatibility with content protection compliant with the Wi-Fi Display specification, for example. In a case where the application type 686 is an application that uses P2P, for example, information about the existence or non-existence of compatibility with video data and the existence or non-existence of compatibility with audio data is stored.

Next, the role of a wireless communication device in a case where wireless communications are performed by WFD (Wi-Fi Display) is described. Specifically, WFD Source and WFD Sink are now described in detail.

FIGS. 14A, 14B, 14C and 14D are diagrams showing example WFD sessions to be conducted by wireless communication devices in the first embodiment of the present technique.

Figure 14A:
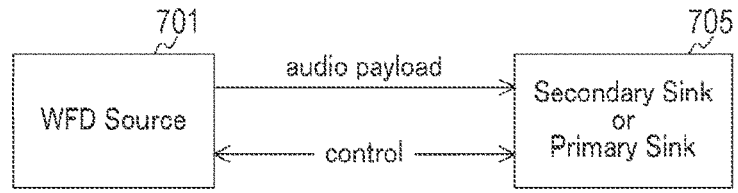
FIGS. 14A, 14B, 14C and 14D are diagrams showing example WFD sessions to be conducted by wireless communication devices in the first embodiment of the present technique.
Figure 14B:
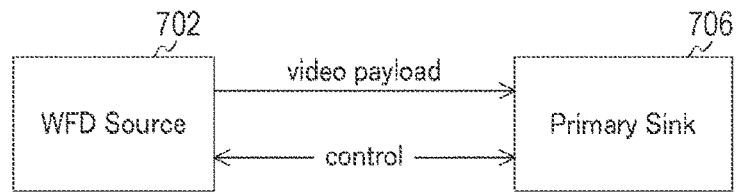
Figure 14C:
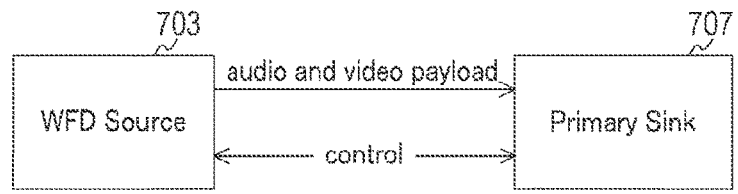
Figure 14D:
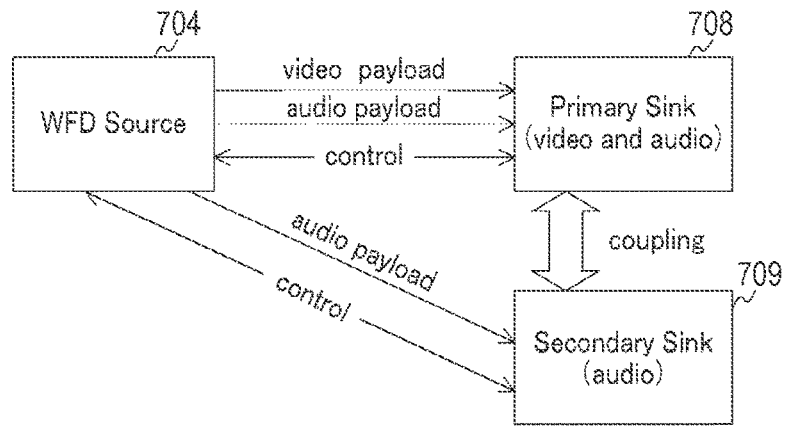

FIG. 14A shows an example WFD session to be conducted in a case where only audio communications are performed. FIG. 14B shows an example WFD session to be conducted in a case where only video communications are performed. FIG. 14C shows an example WFD session to be conducted in a case where audio and video communications are performed. FIG. 14D shows an example WFD session to be conducted in a case where communications with coupled Sinks are performed.

In a WFD session, the wireless communication device playing the role of a transmitter is called WFD Source. For example, the wireless communication devices (WFD Sources 701 through 704) shown on the left side in FIGS. 14A, 14B, 14C and 14D are equivalent to WFD Sources.

In a WFD session, the wireless communication device playing the role of a receiver is called WFD Sink. For example, the wireless communication devices (Secondary Sink or Primary Sink 705, Primary Sinks 706 through 708, and Secondary Sink 709) shown on the right sides in FIGS. 14A, 14B, 14C and 14D are equivalent to WFD Sinks.

As shown in FIGS. 14A, 14B, 14C and 14D, WFD Sources 701 through 704 transmit content data (video data and audio data) to WFD Sinks.

Here, WFD Sinks are classified into the two types: Primary Sinks and Secondary Sinks. Specifically, as shown in FIGS. 14A, 14B, 14C and 14D, Primary Sinks are WFD Sinks that are compatible with video content only, audio content only, or video and audio content.

As shown in FIGS. 14A, 14B, 14C and 14D, Secondary Sinks are WFD Sinks that are compatible with audio content only.

Information about the roles of these wireless communication devices (information indicating whether the role of each wireless communication device is Source or is Sink) is stored into Device Role in this application (688) shown in FIG. 13.

[Example Display of Image Data]

Figure 15:
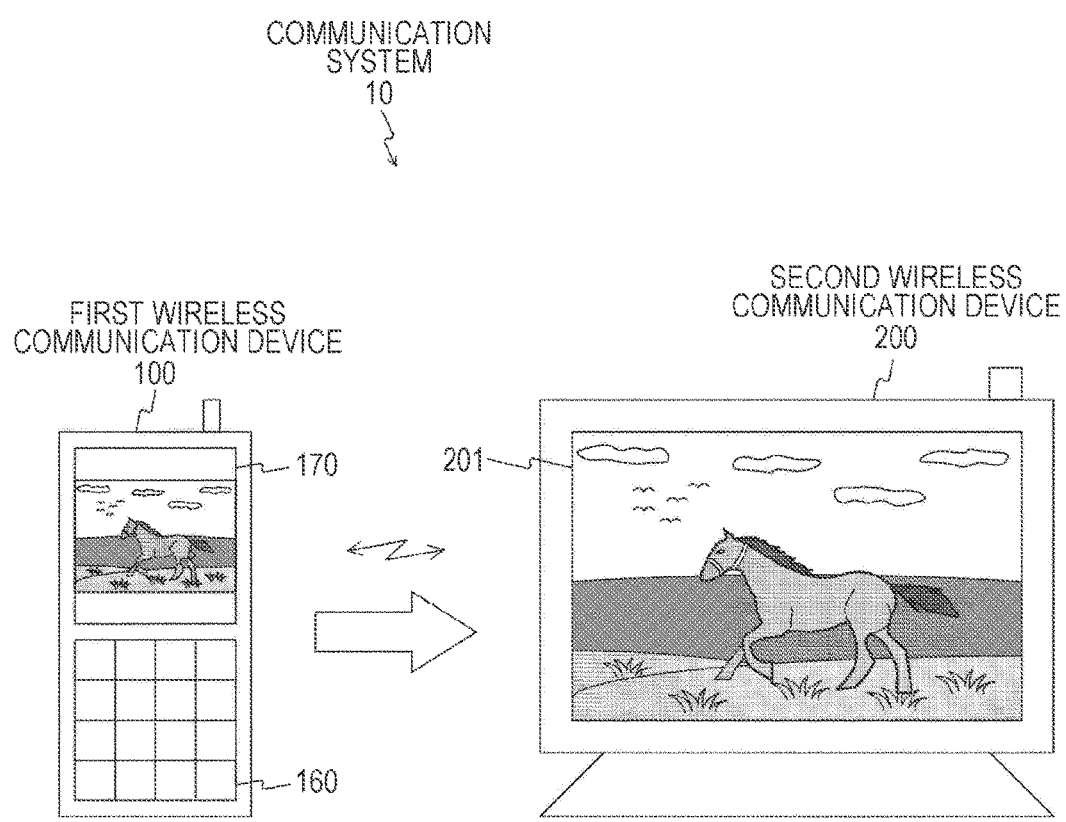
FIG. 15 is a diagram showing an example display in a case where a wireless communication of image data is performed by Wi-Fi CERTIFIED Miracast in the communication system 10 in the first embodiment of the present technique.

FIG. 15 is a diagram showing an example display in a case where a wireless communication of image data is performed by Wi-Fi CERTIFIED Miracast in the communication system 10 in the first embodiment of the present technique. FIG.

15 shows an example case where a wireless communication of image data is performed between a first information processing device 100 and a second information processing device 200, to display the same moving image on the display units of both devices.

For example, the first information processing device 100 transmits image data for displaying the same moving image as the moving image displayed on the display unit 170 to the second information processing device 200. For example, in FIG. 15, a moving image of a horse running on a beach is displayed on the display unit 170 of the first information processing device 100. In this case, the control unit 140 of the first information processing device 100 performs control to transmit image data for displaying the same moving image as the moving image (of a horse running on a beach) displayed on the display unit 170 to the second information processing device 200. Here, image data accompanied by audio data may be transmitted.

The control unit of the second information processing device 200 causes the display unit 201 to display a moving image (of a horse running on a beach) based on the image data transmitted from the first information processing device 100. If the image data is accompanied by audio data, the control unit of the second information processing device 200 outputs sound based on the audio data transmitted from the first information processing device 100 through an audio output unit (not shown).

The first information processing device 100 might include an imaging unit for generating a moving image. In that case, the first information processing device 100 can cause the display unit 170 to display the moving image generated by the imaging unit, and transmit image data for displaying the same moving image as the moving image to the second information processing device 200, to cause the display unit 201 to display the same moving image.

[Example Communication at a Start of Operation of a Specific Application]

FIG. 16 is a sequence chart showing an example communication process to be performed by each device in the first embodiment of the present technique. FIG. 16 illustrates an example communication process to be performed in a case where a specific application is started after establishment of a connection in the second layer.

The sequence chart shown in FIG. 16 is a modification formed by partially modifying the sequence chart shown in FIGS. 5 and 6, and therefore, explanation of the same aspects as those in FIGS. 5 and 6 will not be made below. Specifically, in the communication process indicated by a rectangle 551, the respective procedures (501 through 512) shown in FIGS. 5 and 6 are carried out.

For example, as shown in FIGS. 5 and 6, another application is executed after a L2 (second layer) link is established (551). After a L2 (second layer) link is established as above, a specific application is started by a packet exchange for a specific application start (552). In this packet exchange for a specific application start, each frame (action frame) shown in FIGS. 10 through 12) is transmitted/received. After the packet exchange for a specific application start, the actual data of the specific application can be transmitted (553).

Compared with the example illustrated in FIG. 9, the respective procedures such as the temporary L2 (second layer) link cutoff (542) can be skipped. The procedures that can be skipped are the second Device discovery and the second Service Discovery (optional), for example. Also, the procedures that can be skipped are the second Group Owner Negotiation, the second Association, the second secure link establishment, and the second IP address assignment, for example. As the procedures such as the temporal L2 (second layer) link cutoff (542) can be skipped, the next specific application can be started in a short period of time.

Here, there might be a case where a necessary information exchange is not performed in the first device discovery (equivalent to 501 shown in FIG. 5) included in the packet exchange (501 through 512) portion shown in FIG. 16. In this case, it might not be possible to determine whether the peer is compatible with exchanges of vendor specific action frames. In this case, information indicating that received frames are not to be recognized can be transmitted to notify that the peer is not compatible with vendor specific action frames, for example. As specified in section 7.3.1.11 of the IEEE802.11-2007 specification, for example, "128" through "255" are designated in the category field in an action frame, and a received information element is added to the response to be returned. In this manner, a notification that the receiving side is not compatible with vendor specific action frames can be transmitted.

Also, there might be a case where the receiving side can interpret the contents of a vendor specific action frame, but is not designed to start a designated specific application. In this case, a notification that the receiving side is not compatible can be transmitted by returning a response using an error code defined as a vendor specific information element.

Example cases where action frames are used within the scope of the IEEE802.11-2007 specification have been described in the first embodiment of the present technique. Here, GAS (generic advertisement service) Public Action frames defined in the IEEE802.11u specification might be used. In this case, however, frames are not encrypted. Therefore, in cases where information is exchanged between wireless communication devices while a L2 (second layer) link is already established and a secure link is also established, it is preferable to use action frames.

Also, in the stage of a packet exchange for establishing a second-layer connection, transmission/reception of a packet that contains an information element including information other than necessary information might be performed, as well as designation of the specific application to be used after the second-layer connection, and addition of the information necessary in using the specific application. For example, a packet that contains an information element including information indicating whether to start the specific application might be transmitted/received. In this case, a second-layer connection might be established with the use of a packet containing an information element including information indicating that the specific application is not to be started. In this case, the specific application can be started after the connection establishment, while the second-layer connection is maintained with the use of a packet that contains an information element including information indicating that the specific application is to be started in the same information element. Accordingly, the first embodiment of the present technique can also be applied in such a case.

[Example Operation of a Wireless Communication Device]

Figure 17:
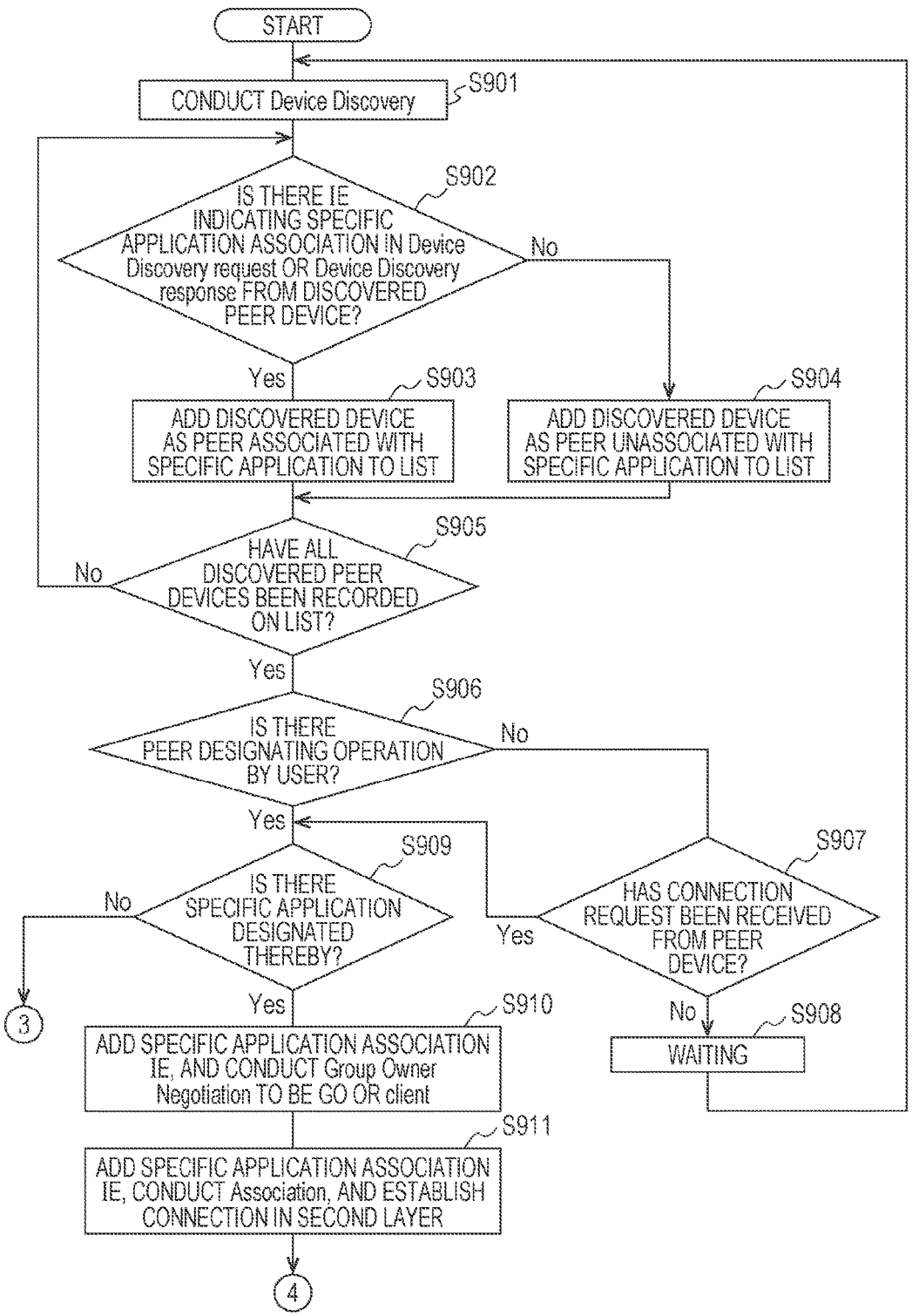
FIG. 17 is a flowchart showing the procedures in an example communication process to be performed by the first wireless communication device 100 in the first embodiment of the present technique.
Figure 18:
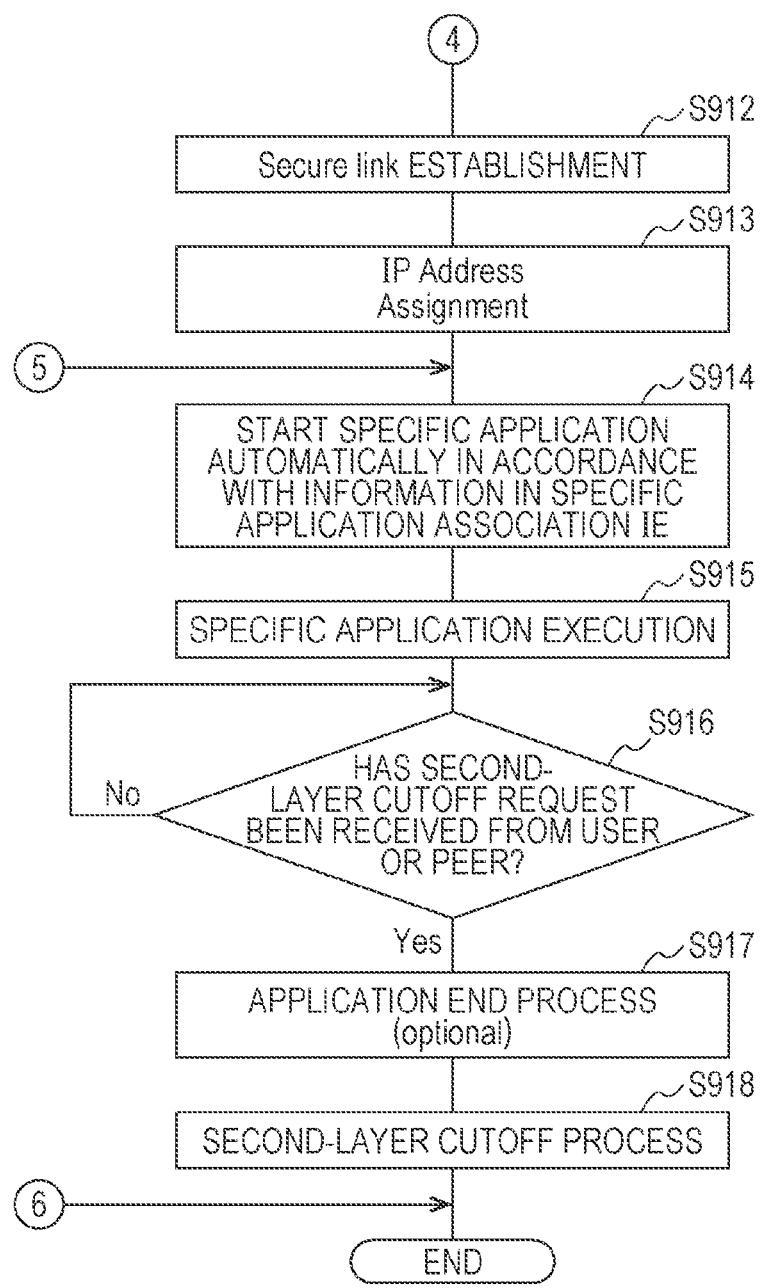
FIG. 18 is a flowchart showing the procedures in the example communication process to be performed by the first wireless communication device 100 in the first embodiment of the present technique.
Figure 19:
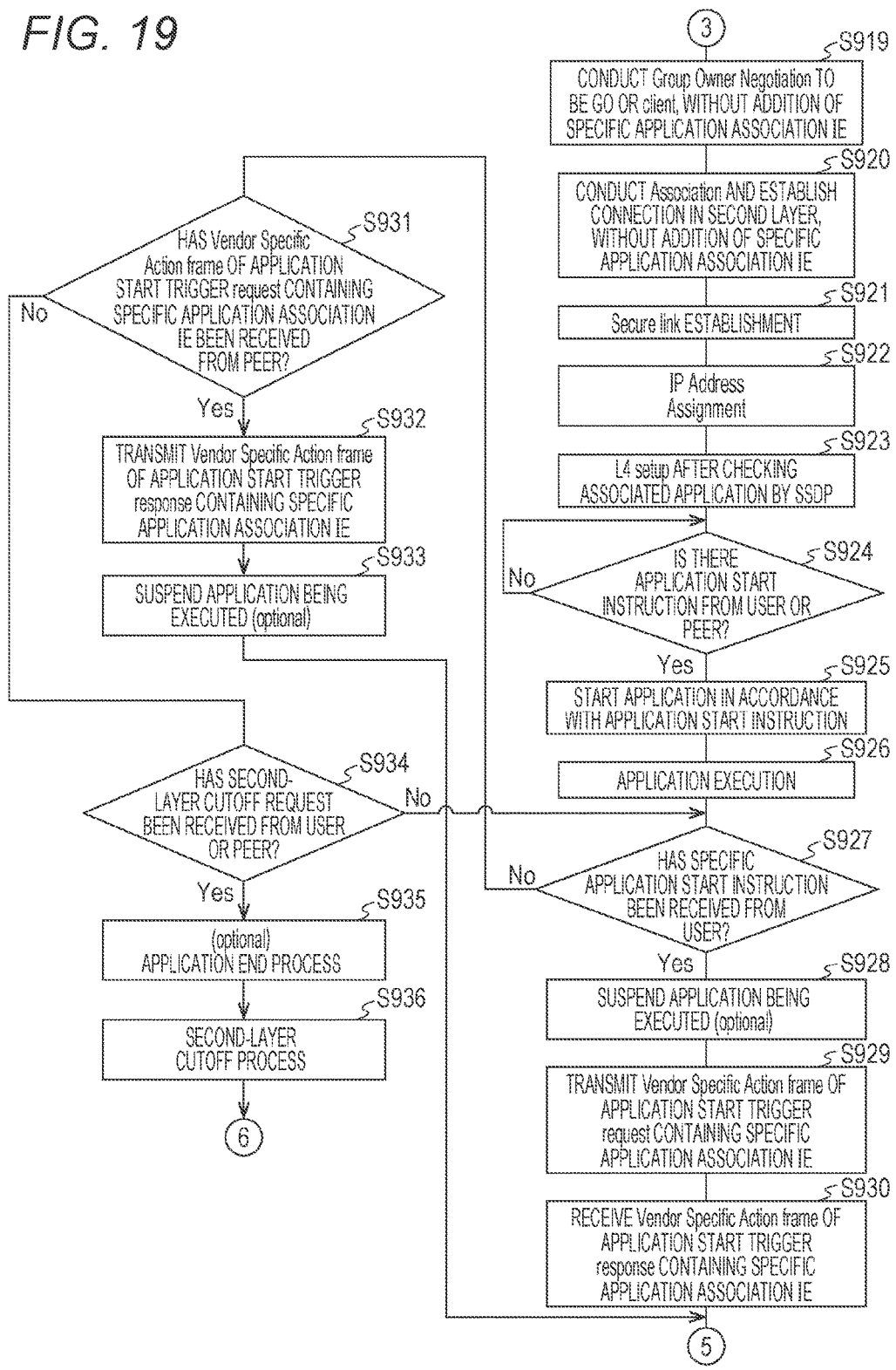
FIG. 19 is a flowchart showing the procedures in the example communication process to be performed by the first wireless communication device 100 in the first embodiment of the present technique.

FIGS. 17 through 19 show a flowchart of the procedures in an example communication process to be performed by the first wireless communication device 100 in the first embodiment of the present technique.

First, the correspondence relationship between the procedures shown in FIGS. 17 through 19 and the respective procedures shown in FIGS. 5, 6, 8, and 9 is described.

Steps S901 through S905 correspond to 521 and 522 shown in FIG. 8. Steps S906 through S909 correspond to 523 shown in FIG. 8. Step S910 corresponds to 524 shown in FIG. 8. Steps S911 through S915 correspond to 527 and 531 shown in FIG. 8.

Step S919 corresponds to 504 shown in FIG. 5. Steps S920 through S926 correspond to 507 through 512 shown in FIGS. 5 and 6.

Steps S927 through S933 and step S914 correspond to 552 shown in FIG. 16. Step S915 corresponds to 553 shown in FIG. 16.

First, the control unit 140 conducts Device Discovery (step S901). The control unit 140 then determines whether an IE indicating specific application association (equivalent to 610 shown in FIG. 7) is included in information from the peer device discovered through the Device Discovery (step S902). The information from the peer device is a Device Discovery request or a Device Discovery response. In a case where an IE indicating specific application association is included (step S902), the control unit 140 records the discovered device as a peer associated with a specific application on a list (such as the peer list 180 shown in FIG. 3) (step S903). In a case where any IE indicating specific application association is not included (step S902), the control unit 140 records the discovered device as a peer unassociated with any specific application on the list (such as the peer list 180 shown in FIG. 3) (step S904). In a case where an IE indicating specific application association is included, for example, "associated" is recorded in the specific application association 184 in the peer list 180 shown in FIG. 3. In a case where any IE indicating specific application association is not included, "N/A" is recorded in the specific application association 184.

The control unit 140 then determines whether all the peer devices discovered through the Device Discovery have been recorded on the list (step S905). In a case where not all the peer devices have been recorded, the control unit 140 returns to step S902. In a case where all the peer devices have been recorded on the list (step S905), the control unit 140 determines whether a peer designating operation has been performed by the user (step S906).

In a case where any peer designating operation has not been performed by the user (step S906), the control unit 140 determines whether a connection request has been received from a peer device (step S907). In a case where any connection request has not been received from any peer device (step S907), the control unit 140 stands by (step S908), and returns to step S901. In a case where a connection request has been received from a peer device (step S907), the control unit 140 moves on to step S909.

In a case where a peer designating operation has been performed by the user (step S906) or where a connection request has been received from a peer device (step S907), the control unit 140 determines whether a specific application has been designated thereby (step S909). For example, on the connection detail select screen 190 shown in FIG. 4, the user performs a peer designating operation or a specific application designating operation. Also, a check is made to determine whether a specific application has been designated based on the information contained in the connection request received from the peer device.

In a case where a specific application has been designated (step S909), the control unit 140 adds the specific application association IE, and conducts Group Owner Negotiation (step S910). Through the Group Owner Negotiation, the first wireless communication device 100 becomes a GO (Group Owner) or a client.

The control unit 140 then adds the specific application association IE, conducts Association, and establishes a connection in the second layer (step S911). The control unit 140 then conducts Secure link establishment (step S912) and IP Address Assignment (step S913).

The control unit 140 then causes the specific application to automatically start in accordance with the information in the specific application association IE (step S914), and executes the specific application (step S915). The control unit 140 then determines whether a second-layer cutoff request has been received from the user or the peer (step S916). In a case where any second-layer cutoff request has not been received, the monitoring is continued. In a case where a second-layer cutoff request has been received (step S916), on the other hand, the control unit 140 performs a specific application end process (step S917), performs a second-layer cutoff process (step S918), and ends the communication process.

In a case where any specific application has not been designated (step S909), the control unit 140 conducts Group Owner Negotiation without addition of the specific application association IE (step S919). Through the Group Owner Negotiation, the first wireless communication device 100 becomes a GO (Group Owner) or a client.

The control unit 140 then conducts Association and establishes a connection in the second layer without addition of the specific application association IE (step S920). The control unit 140 then conducts Secure link establishment (step S921) and IP Address Assignment (step S922).

The control unit 140 then checks associated applications by SSDP, and conducts L4 setup (step S923). The control unit 140 then determines whether an application start instruction has been received from the user or the peer (step S924). In a case where any application start instruction has not been received, the monitoring is continued. In a case where an application start instruction has been received (step S924), on the other hand, the control unit 140 starts an application in accordance with the application start instruction (step S925), and executes the application (step S926).

The control unit 140 then determines whether a specific application start instruction has been received from the user (step S927). In a case where a specific application start instruction has been received, the control unit 140 suspends the application being currently executed (step S928). The control unit 140 then transmits the Vendor Specific Action frame of an application start trigger request including the specific application association IE to the peer (step S929). The control unit 140 then receives the Vendor Specific Action frame of an application start trigger response including the specific application association IE from the peer (step S930).

In a case where the specific application here is Wi-Fi CERTIFIED Miracast, a user operation for starting a wireless communication of image data, for example, is accepted as a specific application start instruction (step S927). For example, a user operation (such as a touch operation on a touch panel or a pressing operation using an operational tool) for starting a wireless communication of the image data shown in FIG. 15 is accepted by the operation accepting unit 160 (step S927). In this case, the control unit 140 transmits a Vendor Specific Action frame to the peer based on the timing of acceptance of the user operation (the user operation for starting the wireless communication of the image data) (step S929).

Here, the Vendor Specific Action frame is the Action frame shown in FIGS. 10 through 12, and contains the vendor specific IE (the specific application association IE).

The control unit 140 then causes the specific application to automatically start in accordance with the information in the specific application association IE (step S914), and executes the specific application (step S915).

In a case where any specific application start instruction has not been received (step S927), the control unit 140 determines whether the Vendor Specific Action frame of an application start trigger request containing the specific application association IE has been received (step S931). In a case where the Action frame has been received (step S931), the control unit 140 transmits the Vendor Specific Action frame of an application start trigger response including the specific application association IE to the peer (step S932). The control unit 140 then suspends the application being executed (step S933), and moves on to step S914.

In a case where the specific application here is Wi-Fi CERTIFIED Miracast, a user operation for starting a wireless communication of image data, for example, is accepted as a specific application start instruction by the peer. For example, a user operation for starting a wireless communication of the image data shown in FIG. 15 is accepted by the peer. In this case, the communication unit 102 receives a Vendor Specific Action frame from the peer based on the timing of acceptance of the user operation (the user operation for starting the wireless communication of the image data) (step S931).

In a case where the Action frame has not been received (step S931), the control unit 140 determines whether a second-layer cutoff request has been received from the user or the peer (step S934). In a case where any second-layer cutoff request has not been received (step S934), the control unit 140 returns to step S927, and continues the monitoring. In a case where a second-layer cutoff request has been received (step S934), on the other hand, the control unit 140 performs an application end process (step S935), performs a second-layer cutoff process (step S936), and ends the communication process.

The suspension process (steps S928 and S933) for suspending an application being executed is now described. An example case where the application being operated (a first application) is DLNA, and the application (a second application) to be made to start during operation of the first application is Wi-Fi CERTIFIED Miracast is described herein. That is, the second application is an example of a specific application to be started by transmission/reception of an action frame request/response.

In a case where the application being operated is suspended, one wireless communication device (the first wireless communication device 100 or the peer) transmits a FIN packet (finish packet) to the other wireless communication device, for example. A FIN packet can be transmitted in TCP (Transmission Control Protocol) used as HTTP (HyperText Transfer Protocol) of DLNA, for example. The wireless communication device that has transmitted a request frame might transmit a FIN packet, for example. The wireless communication device that has received the FIN packet returns an ACK packet (ACKnowledgement packet) to the peer (the wireless communication device that has transmitted the FIN packet).

The wireless communication device that has transmitted the ACK packet then transmits a FIN packet to the peer (the wireless communication device to which the ACK packet has been transmitted). The wireless communication device that has received the FIN packet (the wireless communication device that has transmitted the first FIN packet) returns an ACK packet to the peer (the wireless communication device that has transmitted the next FIN packet in response to the first FIN packet).

Through these exchanges, a process of closing the TCP port used by DLNA is performed, and the resource is released.

An example case where RTSP for Wi-Fi CERTIFIED Miracast is started when data transmission by DLNA has not been finished (or while a FIN packet and an ACK packet are being exchanged) is not described. In this case, data received by the peer is not handed on to an application but is simply discarded. Therefore, RTSP for Wi-Fi CERTIFIED Miracast may be started before the second exchange of a FIN packet and an ACK packet is finished between the wireless communication devices.

Alternatively, RTSP for Wi-Fi CERTIFIED Miracast may be started after the second exchange of a FIN packet and an ACK packet is finished between the wireless communication devices. In such a case, however, the time required for the suspension process (end process) is undetermined, and therefore, there is a possibility that a timeout occurs at a start of RTSP. In view of this, it is preferable to set an appropriate timing to start RTSP for Wi-Fi CERTIFIED Miracast.

In the process to suspend the application being operated, the TCP port of UPnP (Universal Plug and Play) may be left open, or may be temporarily closed. UPnP is used from device discovery to capability confirmation of DLNA, for example.

In this example, operation of the first application is ended based on the timing to start operation of the second application. However, the first application being operated may also be ended after the second application is established and an exchange of content data is started.

After the start of operation of the second application, the operation of the first application may not be ended but be continued, and the transmission/reception of data about the first application (the volume of communication) may be reduced. For example, the transmission/reception of the data about the first application can be reduced based on the timing to start the operation of the second application. In this case, a connection to the peer is maintained to such a degree that the wireless communication devices are not disconnected from each other. For example, while transmission/reception of video data and audio data is not performed, only an exchange of information may be performed to keep the connection alive so that the first application will not cause a timeout. That is, to reduce the transmission/reception of the data about the first application, the operation state of the first application (such as the state of the exchange of the keep-alive information) is regularly or irregularly checked. If there is no response from the peer as a result of the check, the first application may be ended.

In the above described example, the first application is DLNA, and the second application is Wi-Fi CERTIFIED Miracast. However, the above example can be applied in cases where the first application is some other application (such as an application for transferring a file, copying a file, or the like).

Steps S901 through S926 are an example of the first procedure disclosed in the claim. Steps S929 through S932 are an example of the second procedure disclosed in the claim.

As described above, under the control of the control unit 140, the communication unit 102 performs respective reception processes and respective transmission processes. For example, the communication unit 102 performs an inter-device wireless communication with another wireless communication device in accordance with the Wi-Fi Direct specification. Also, the communication unit 102 transmits information about the role of the first wireless communication device 100, information about the fourth layer, and capability information, which are contained in an action frame specified in the IEEE802.11 specification. In this case, the communication unit 102 performs the transmission when P2P-connected to another wireless communication device.

Also, the communication unit 102 receives information about the role of the first wireless communication device 100, information about the fourth layer, and capability information, which are contained in an action frame specified in the IEEE802.11 specification. In this case, the communication unit 102 performs the reception when P2P-connected to another wireless communication device.

The control unit 140 operates the first application designated in a connection discovery process based on the timing of establishment of an inter-device wireless communication connection. Also, when the second application is executed while the first application is being operated, the communication unit 102 transmits information about the second application contained in an action frame specified in the IEEE802.11 specification. Here, the information about the second application is at least one piece of information about the role of the first wireless communication device 100, information about the fourth layer, and capability information. Also, the control unit 140 can end the first application based on the timing to start operation of the second application. Also, the control unit 140 can reduce the amount of data to be communicated about the first application based on the timing to start operation of the second application. In this case, after the start of operation of the second application, the control unit 140 regularly or irregularly checks the operation state of the first application.

Also, when the second application is executed while the first application is being operated, the communication unit 102 receives information about the second application contained in an action frame specified in the IEEE802.11 specification.

The protocol switching unit 141 switches the protocol using an inter-device wireless communication between a protocol compatible with the first application and a protocol compatible with the second application. An example case where the protocol switched by the protocol switching unit 141 is a protocol compatible with the second application (such as Wi-Fi CERTIFIED Miracast) is now described. In this case, the communication unit 102 transmits image data displayed on the display unit 170 to the other wireless communication device, by using the protocol switched by the protocol switching unit 141, for example. Meanwhile, the communication unit 102 receives image data to be displayed on the display unit 140 from the other wireless communication device, by using the protocol switched by the protocol switching unit 141.

The control unit 140 performs control to designate a specific application in a case where any specific application is not designated at the time of an establishment process to establish a wireless connection (a connection in the second layer) but a specific application is designated after establishment of a wireless connection. In this case, the control unit 140 performs control to designate a specific application by transmitting/receiving data including information (shown in FIGS. 10 through 12) equivalent to the information element (shown in FIG. 7) for designating the specific application without cutoff of the wireless connection. The control unit 140 also transmits/receives an encrypted frame as data including the information equivalent to the information element.

For example, in a case where a specific application is designated by a user operation after a wireless connection is established, the control unit 140 transmits data including the information equivalent to the information element for designating a start of the specific application without cutoff of the wireless connection. By this transmission, the specific application is designated. On the other hand, there is a case where data including the information equivalent to the information element for designating a specific application is received from a wirelessly-connected wireless communication device (such as the second wireless communication device 200) after a wireless connection is established. In this case, the control unit 140 transmits data including the information equivalent to the information element for designating a start of the specific application, as a response to the data, to the wireless communication device (such as the second wireless communication device 200) without cutoff of the wireless connection. By this transmission, the specific application is designated.

Specifically, the control unit 140 transmits/receives a vendor specific action frame specified in the IEEE802.11 specification as the data including the information equivalent to the information element, for example. In this case, the control unit 140 transmits a vendor specific action frame that is a request frame using a vendor specific Information Element as the information element. Also, the control unit 140 transmits a vendor specific action frame that is a response frame using a vendor specific Information Element as the information element.

The control unit 140 also encapsulates an association request frame body containing the information element into a vendor specific action frame to be transmitted. This association request frame body has a vendor specific Information Element used as the information element, and contains the information element.

The control unit 140 also encapsulates an association response frame body containing the information element into a vendor specific action frame to be transmitted. This association response frame body has a vendor specific Information Element used as the information element, and contains the information element.

In a case where a specific application that has not been designated at the time of an establishment process to establish a wireless connection is newly designated after the wireless connection is established, the control unit 140 may perform control to designate the new specific application. It should be noted that the communication unit 102 and the control unit 140 are an example of the transmitting unit in the claims.

As described above, in the first embodiment of the present technique, a specific application can be designated at the time of device discovery or service discovery conducted before a connection is established in the second layer. Even in a case where any specific application is not designated at the time of device discovery or service discovery, a frame including a predetermined information element can be transmitted after a connection is established in the second layer. The predetermined information element may be an information element to be transmitted/received at the time of device discovery or service discovery. With this, a specific application to be used after establishment of a connection in the second layer can be newly designated and started, without cutoff of the connection in the second layer. That is, a user can readily use a desired application.

For example, it is possible to switch to a specific application while maintaining a Wi-Fi Direct connection. For example, even in a case where Wi-Fi CERTIFIED Miracast is designated and executed during operation of DLNA, Wi-Fi CERTIFIED Miracast can be started without cutoff of the connection in the second layer. Specifically, even in a case where switching to a specific application (such as Wi-Fi CERTIFIED Miracast) is performed after establishment of a connection in the second layer, cutoff of the connection in the second layer and reconnection in the second layer can be skipped. With this, the trouble the use needs to take and the waiting time of the user can be reduced. Also, the number of packets required in operation can be reduced, and congestion in wireless communication channels can be relieved.

Also, in the first embodiment of the present technique, information necessary for starting a specific application is exchanged by using action frames that are used on a one-to-one basis. As the action frames can be encrypted, resistance to attacks from others can be increased, which is preferable in terms of security.

2. Second Embodiment

In the first embodiment of the present technique, wireless communication devices that exchange various kinds of information by using wireless communications have been described. The first embodiment of the present technique can also be applied to information processing devices (such as semiconductor integrated circuits) used in wireless communication devices.

In view of this, a second embodiment of the present technique shows an example of an information processing device (such as a semiconductor integrated circuit) used in a wireless communication device.

[Example Structure of an Information Processing Device]

Figure 20:
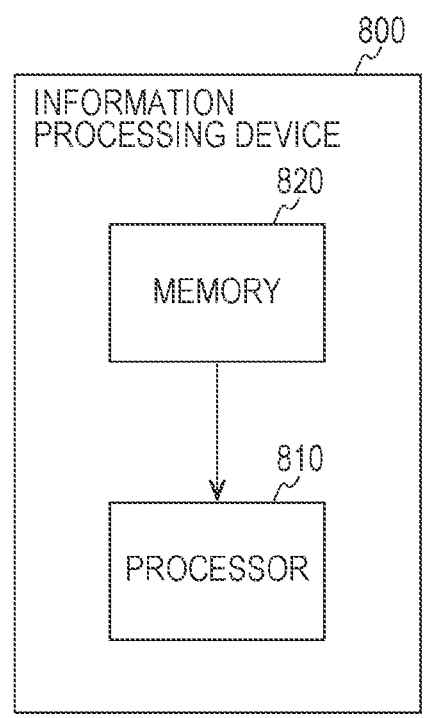
FIG. 20 is a block diagram showing an example structure of an information processing device 800 in a second embodiment of the present technique.

FIG. 20 is a block diagram showing an example structure of an information processing device 800 in the second embodiment of the present technique.

The information processing device 800 includes a processor 810 and a memory 820. The information processing device 800 is realized by a semiconductor integrated circuit, for example. For ease of explanation, components other than the processor 810 and the memory 820 are not shown in FIG. 20, and explanation of them will not be made herein.

The processor 810 is a processor that performs respective processes based on a program stored in the memory 820.

The memory 820 is a memory that stores the program for causing the processor 810 to perform respective processes. Here, the program stored in the memory 820 is the program for causing the processor 810 to perform the respective processes described in the first embodiment of the present technique.

An example case where the wireless communication device using the information processing device 800 operates as the transmitting side is now described. In this case, the program stored in the memory 820 causes the processor 810 to carry out a first procedure to perform an inter-device wireless communication with another device in accordance with the Wi-Fi Direct specification, for example. Also, the program stored in the memory 820 causes the processor 810 to carry out a second procedure to transmit an action frame that is specified in the IEEE802.11 specification and contains information about the role of the wireless communication device using the information processing device 800.

An example case where the wireless communication device using the information processing device 800 operates as the receiving side is now described. In this case, the program stored in the memory 820 causes the processor 810 to carry out a first procedure to perform an inter-device wireless communication with another device in accordance with the Wi-Fi Direct specification, for example. Also, the program stored in the memory 820 causes the processor 810 to carry out a second procedure to receive an action frame that is specified in the IEEE802.11 specification and contains information about the role of the wireless communication device using the information processing device 800.

The program stored in the memory 820 also causes the processor 810 to carry out signal processing procedures to process image data, for example. Further, the program stored in the memory 820 causes the processor 810 to carry out procedures to adjust power consumption in accordance with operation of the processor 810.

[Example of Relationship Between Performance and Power Consumption]

Figure 21:
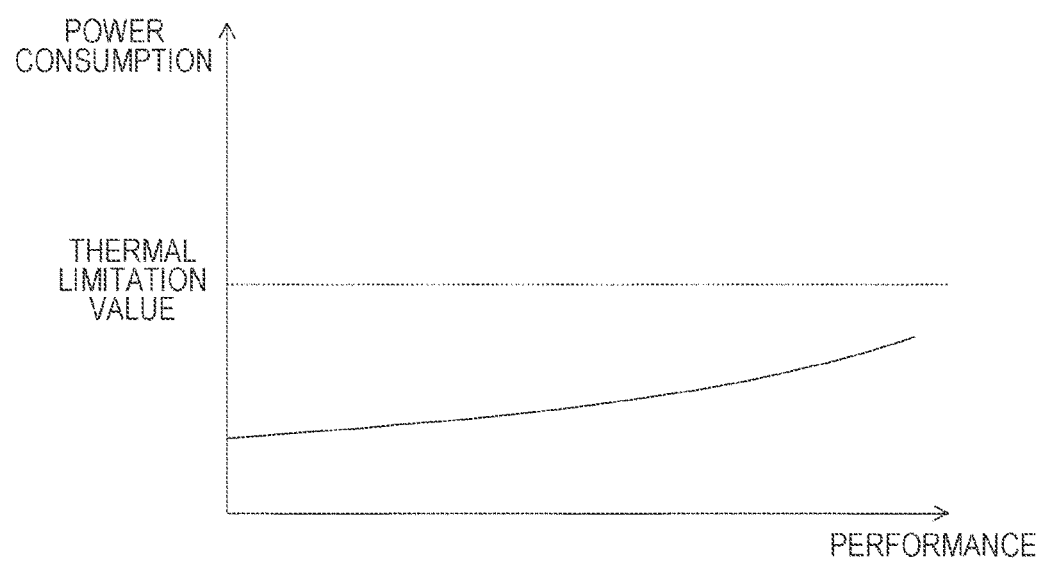
FIG. 21 is a diagram showing an example of a relationship between performance and power consumption of the information processing device 800 in the second embodiment of the present technique.

FIG. 21 is a diagram showing an example of a relationship between performance and power consumption of the information processing device 800 in the second embodiment of the present technique.

In the graph shown in FIG. 21, the ordinate axis indicates power consumption of the information processing device 800, and the abscissa axis indicates performance of the information processing device 800.

As shown in FIG. 21, the information processing device 800 is controlled so that its power consumption will not exceed a thermal limitation value even when its performance is improved. That is, the processor 810 is controlled to adjust power consumption in accordance with operation of the device.

As described above, with the use of wireless communication devices each including the information processing device 800, a specific application to be used after establishment of a connection in the second layer can be newly designated and started, without cutoff of the connection in the second layer, as in the first embodiment of the present technique. That is, a user can readily use a desired application. For example, even in a case where Wi-Fi CERTIFIED Miracast is designated and executed during operation of DLNA, Wi-Fi CERTIFIED Miracast can be started without cutoff of the connection in the second layer.

The above described embodiments are merely examples for embodying the present technique, and the items in the embodiments correspond to the items of the subject matter in the claims. Likewise, the items of the subject matter in the claims correspond to the items with the same names in the embodiments of the present technique. However, the present technique is not limited to the embodiments, and more specific embodiments can be formed by making various changes to the embodiments without departing from the scope thereof.

The processing procedures described above in the embodiments may be regarded as a method including the series of procedures, or may be regarded as a program for causing a computer to carry out the series of procedures or a recording medium storing the program. The recording medium may be a CD (Compact Disc), an MD (Mini Disc), a DVD (Digital Versatile Disk), a memory card, or a Blu-ray Disc (a registered trade name), for example.

The present technique may also be embodied in the structures described below.

(1)

A wireless communication device that performs an inter-device wireless communication with another wireless communication device in accordance with the Wi-Fi (Wireless Fidelity) Direct specification, the wireless communication device including a transmitting unit that incorporates information about a role of the wireless communication device into an action frame specified in the IEEE (Institute of Electrical and Electronic Engineers) 802.11 specification, and transmits the action frame.

(2)
The wireless communication device of (1), wherein the transmitting unit performs the transmission when the wireless communication device is P2P (Peer-to-Peer)-connected to the other wireless communication device.

(3)
The wireless communication device of (1) or (2), wherein the information about the role of the wireless communication device is information about one of a source and a sink that are compliant with the Wi-Fi Display specification.

(4)
The wireless communication device of any of (1) through (3), wherein the action frame is a vendor specific action frame specified in the IEEE802.11 specification.

(5)
The wireless communication device of (4), wherein the information about the role of the wireless communication device is incorporated into a vendor specific content area in the vendor specific action frame.

(6)
The wireless communication device of any of (1) through (5), wherein the action frame includes a type information portion and an information element portion.

(7)
The wireless communication device of any of (1) through (6), wherein the control unit incorporates information about a fourth layer into the action frame, and transmits the action frame.

(8)
The wireless communication device of (7), wherein the information about the fourth layer includes at least information about RTSP.

(9)
The wireless communication device of (8), wherein the information about the fourth layer includes at least information about a port number used in the RTSP.

(10)
The wireless communication device of any of (7) through (9), wherein the information about the role of the wireless communication device and the information about the fourth layer are arranged so that the information about the role of the wireless communication device comes before the information about the fourth layer in the action frame.

(11)
The wireless communication device of any of (1) through (10), wherein the transmitting unit incorporates capability information into the action frame, and transmits the action frame.

(12)
The wireless communication device of (11), wherein the capability information includes at least information about existence or non-existence of compatibility with content protection compliant with the Wi-Fi Display specification.

(13)
A wireless communication device including:
a communication unit that performs an inter-device wireless communication with another device discovered through a connection discovery process;
and a control unit that operates a first application designated in the connection discovery process based on timing of establishment of a connection of the inter-device wireless communication, wherein,
when a second application is executed while the first application is being operated, the communication unit incorporates information about the second application into an action frame specified in the IEEE802.11 specification, and transmits the action frame.

(14)
The wireless communication device of (13), wherein the control unit ends the first application based on timing of a start of operation of the second application.

(15)
The wireless communication device of (13), wherein the control unit reduces an amount of data being communicated about the first application based on timing of a start of operation of the second application.

(16)
The wireless communication device of (15), wherein the control unit regularly or irregularly checks an operation state of the first application after the start of operation of the second application.

(17)
The wireless communication device of any of (13) through (16), wherein the second application is Wi-Fi CERTIFIED Miracast.

(18)
The wireless communication device of any of (13) through (17), wherein the first application is DLNA (Digital Living Network Alliance).

(19)
The wireless communication device of (18), wherein the communication unit transmits a FIN packet (finish packet) in TCP (Transmission Control Protocol) based on timing of the start of operation of the second application.

(20)
A wireless communication device that performs an inter-device wireless communication with another wireless communication device in accordance with the Wi-Fi (Wireless Fidelity) Direct specification, the wireless communication device including:
a transmitting unit that incorporates information about a role of the wireless communication device into an action frame specified in the IEEE (Institute of Electrical and Electronic Engineers) 802.11 specification, and transmits the action frame;
a display unit that displays image data; and
a protocol switching unit that switches the protocol using the inter-device wireless communication.

(21)
The wireless communication device of (20), further including an operation accepting unit that accepts a user operation, wherein the transmitting unit transmits the information about the role of the wireless communication device based on timing of acceptance of a user operation for starting a communication of image data, the user operation having been accepted by the operation accepting unit.

(22)
The wireless communication device of (20) or (21), wherein the transmitting unit transmits image data displayed on the display unit, by using the protocol switched by the protocol switching unit.

(23)
An information processing device including:
a processor;
and a memory that stores a program to be executed by the processor, wherein the program causes the processor to carry out:
a first procedure to perform an inter-device wireless communication with another device in accordance with the Wi-Fi Direct specification;

and a second procedure to incorporate information about a role of the wireless communication device using the information processing device into an action frame specified in the IEEE802.11 specification, and transmit the action frame.

(24)
The information processing device of (23), wherein the program further causes the processor to carry out a signal processing procedure to process image data.

(25)
The information processing device of (23) or (24), wherein the program further causes the processor to carry out a procedure to adjust power consumption in accordance with operation of the processor.

(26)
A communication method including:
a first procedure to perform an inter-device wireless communication with another wireless communication device in accordance with the Wi-Fi Direct specification;
and a second procedure to incorporate information about a role of the current wireless communication device into an action frame specified in the IEEE802.11 specification, and transmit the action frame

REFERENCE SIGNS LIST

10 Communication system
100 First wireless communication device
101 Antenna
110 Data processing unit
120 Transmission processing unit
130 Wireless interface unit
140 Control unit
141 Protocol switching unit
150 Memory
160 Operation accepting unit
170 Display unit
200 Second wireless communication device
300 Third wireless communication device
400 Fourth wireless communication device
800 Information processing device
810 Processor
820 Memory

The invention claimed is:
1. A wireless communication device, comprising:
circuitry configured to:
establish a wireless connection in a data link layer (L2) with a first device based on designation of a first application;
transmit content data to the first device based on the first application;
designate a second application based on a transmission of a first signal,
wherein the first signal includes information for the designation of the second application, and
wherein the first signal is transmitted such that the established wireless connection is maintained;
display an image based on the content data;
execute the second application; and
transmit image data, associated with the displayed image, to the first device based on the execution of the second application,
wherein the second application is executed while the first application is performed,
wherein the first device displays the image based on the image data while the image is displayed at the wireless communication device,
wherein the second application corresponds to Wi-Fi certified Miracast and is executed via a direct wireless connection with the first device, and
wherein the information is compliant with Wi-Fi Display specification and includes device role information, port information for a protocol associated with the second application and content protection compatibility information.

2. The wireless communication device according to claim 1, wherein the designation of the second application is based on a user operation after the wireless connection is established.

3. The wireless communication device according to claim 1,
wherein the transmission of the first signal is based on a reception of a second signal through the established wireless connection from the first device, and
wherein the second signal includes the information for the designation of the first application.

4. The wireless communication device according to claim 1, wherein the circuitry is further configured to transmit a vendor specific action frame specified in an IEEE (Institute of Electrical and Electronics Engineers) 802.11 specification as the first signal, which includes the information for the designation of the second application.

5. The wireless communication device according to claim 4,
wherein the circuitry is further configured to transmit a request frame as the vendor specific action frame, the request frame comprises a vendor specific Information Element, and
wherein the vendor specific Information Element includes information for identification of the second application to be started and information to specify a role of the wireless communication device that transmits the request frame to play in the second application.

6. The wireless communication device according to claim 4,
wherein a control unit, at the first device, transmits a response frame as the vendor specific action frame, the response frame comprises a vendor specific Information Element, and
wherein the vendor specific Information Element includes information for identification of the second application to be started and information to specify a role of the first device that transmits the response frame based on a request frame to play in the second application.

7. The wireless communication device according to claim 4,
wherein the circuitry is further configured to:
encapsulate an association request frame body into the vendor specific action frame, and
transmit the vendor specific action frame, and
wherein the association request frame body comprises a vendor specific Information Element, which includes information for identification of the second application to be started and information to specify a role of the wireless communication device that transmits a request frame to play in the second application.

8. The wireless communication device according to claim 4,
wherein the circuitry is further configured to:
encapsulate an association response frame body into the vendor specific action frame; and
transmit the vendor specific action frame, wherein the association response frame body comprises a vendor specific Information Element, which includes information for identification of the second application to be started and information to specify a role of the wireless communication device that transmits a response frame based on a request frame to play in the second application.

9. The wireless communication device according to claim 1, wherein the circuitry is further configured to transmit an encrypted frame as the first signal.

10. The wireless communication device according to claim 1,
wherein the circuitry is further configured to discover the first device by transmission/reception of one of a Probe Request or a Probe Response specified in an IEEE (Institute of Electrical and Electronics Engineers) 802.11 specification, and
wherein one of the Probe Request or the Probe Response comprises information which indicates an associated specific application.

11. The wireless communication device according to claim 1, wherein the wireless communication device is compliant with an IEEE (Institute of Electrical and Electronics Engineers) 802.11 specification to enable P2P (Peer to Peer) connections.

12. The wireless communication device according to claim 1, wherein the wireless communication device is a mobile phone.

13. The wireless communication device according to claim 12, wherein the wireless communication device further configured to execute the Wi-Fi certified Miracast as a source device.

14. A wireless communication device, comprising:
circuitry configured to:
discover a first device by execution of a discovery process on the wireless communication device before a wireless connection is established,
establish the wireless connection in a data link layer (L2) with the first device based on a designation of a first application;
receive content data from the first device based on the first application;
receive, from the first device, a first signal that include information for a designation of a second application;
wherein the first signal is received such that the established wireless connection is maintained;
receive image data, from the first device, based on the execution of the second application,
wherein the image data is associated with the image displayed at the first device; and
display the image based on the image data while an image is displayed at the first device,
wherein the second application is executed while the first application is performed,
wherein the second application corresponds to Wi-Fi certified Miracast and is executed via a direct wireless connection with first device, and
wherein the information is compliant with Wi-Fi Display specification and includes device role information, port information for a protocol associated with the second application and content protection compatibility information.

15. The wireless communication device according to claim 14, wherein the wireless communication device is a Television (TV).

16. The wireless communication device according to claim 15, wherein the wireless communication device is further configured to execute the Wi-Fi certified Miracast as a sink device.

17. A communication method, comprising:
in a wireless communication device:
establishing a wireless connection in a data link layer (L2) with a first device based on a designation of a first application;
transmitting content data to the first device based on the first application;
designating a second application based on a transmission of a first signal,
wherein the first signal includes information for the designation of the second application, and
wherein the first signal is transmitted such that the established wireless connection is maintained;
displaying an image based on the content data;
executing the second application; and
transmitting image data, associated with the displayed image, to the first device based on the execution of the second application,
wherein the second application is executed while the first application is performed,
wherein the first device displays the image based on the image data while the image is displayed at the wireless communication device,
wherein the second application corresponds to Wi-Fi certified Miracast and is executed via a direct wireless connection with the first device, and
wherein the information is compliant with Wi-Fi Display specification and includes device role information, port information for a protocol associated with the second application and content protection compatibility information.

18. A non-transitory computer-readable medium having stored thereon computer-executable instructions that, when executed by a wireless communication device, cause the wireless communication device to execute operations, the operations comprising:
establishing a wireless connection in a data link layer (L2) with a first device based on designation of a first application;
transmitting content data to the first device based on the first application;
designating a second application based on a transmission of a first signal,
wherein the first signal includes information for the designation of the second application, and
wherein the first signal is transmitted such that the established wireless connection is maintained;
displaying an image based on the content data;
executing the second application; and
transmitting image data, associated with the displayed image, to the first device based on the execution of the second application,
wherein the second application is executed while the first application is performed,
wherein the first device displays the image based on the image data while the image is displayed at the wireless communication device,
wherein the second application corresponds to Wi-Fi certified Miracast and is executed via a direct wireless connection with the first device, and
wherein the information is compliant with Wi-Fi Display specification and includes device role information, port information for a protocol associated with the second application and content protection compatibility information.

\* \* \* \* \*